US008582061B2

(12) United States Patent
Woo et al.

(10) Patent No.: US 8,582,061 B2
(45) Date of Patent: Nov. 12, 2013

(54) OPTICAL FILM ASSEMBLY AND DISPLAY DEVICE HAVING THE SAME

(75) Inventors: Hwa-Sung Woo, Suwon-si (KR);
Seung-Ju Lee, Hwaseong-si (KR);
Hee-Wook Do, Cheonan-si (KR);
Jeong-Soo Choi, Suwon-si (KR);
Hee-Seop Kim, Hwaseong-si (KR);
Joo-Seok Yeom, Gwacheon-si (KR);
Hyang-Yul Kim, Hwaseong-si (KR);
Joo-Nyung Jang, Gyeongsan-si (KR);
Sung-Woon Kim, Suwon-si (KR);
Cheol Shin, Hwaseong-si (KR);
Dong-Chul Shin, Seoul (KR)

(73) Assignee: Samsung Display Co., Ltd. (KR)

( * ) Notice: Subject to any disclaimer, the term of this patent is extended or adjusted under 35 U.S.C. 154(b) by 889 days.

(21) Appl. No.: 12/632,132

(22) Filed: Dec. 7, 2009

(65) Prior Publication Data

US 2010/0328593 A1 Dec. 30, 2010

(30) Foreign Application Priority Data

Jun. 29, 2009 (KR) ........................ 10-2009-0058177

(51) Int. Cl.
*G02F 1/1335* (2006.01)

(52) U.S. Cl.
USPC .............. 349/119; 349/118; 349/120; 349/96

(58) Field of Classification Search
USPC ............................................ 349/96, 118–120
See application file for complete search history.

(56) References Cited

U.S. PATENT DOCUMENTS

| 7,227,602 B2* | 6/2007 | Jeon et al. ...................... 349/119 |
| 7,948,592 B2* | 5/2011 | Do et al. ........................ 349/118 |
| 2005/0062917 A1* | 3/2005 | Kashima ........................ 349/120 |

* cited by examiner

*Primary Examiner* — Huyen Ngo
(74) *Attorney, Agent, or Firm* — Cantor Colburn LLP

(57) ABSTRACT

An optical film assembly includes a first polarization plate disposed below a liquid crystal layer and having a first absorption axis, a second polarization plate disposed above the liquid crystal layer and having a second absorption axis, an A-plate disposed between the first polarization plate and the second polarization plate, and a negative C-plate disposed between the first polarization plate and the second polarization plate. A thickness-direction phase retardation value of the negative C-plate is equal to or less than a value acquired by subtracting about 75 nanometers from a thickness-direction phase retardation value of the liquid crystal layer and the thickness-direction phase retardation value of the negative C-plate is equal to or greater than a value acquired by subtracting about 275 nanometers from the thickness-direction phase retardation value of the liquid crystal layer.

20 Claims, 20 Drawing Sheets

OPTICAL FILM ASSEMBLY AND DISPLAY DEVICE HAVING THE SAME

This application claims priority to Korean Patent Application No. 10-2009-0058177, filed on Jun. 29, 2009, and all the benefits accruing therefrom under 35 U.S.C. §119, the content of which in its entirety is herein incorporated by reference.

BACKGROUND OF THE INVENTION (1) Field of the Invention

The present invention relates to an optical film assembly and a display device including the optical film assembly. More particularly, the present invention relates to an optical film assembly which substantially improves side visibility thereof, and a display device including the optical film assembly.

(2) Description of the Related Art

A liquid crystal display ("LCD") device generally includes an LCD panel which displays an image using light transmittance of liquid crystal molecules, and a backlight assembly disposed below the LCD panel and which provides the LCD panel with light.

The LCD panel typically includes a first substrate, a second substrate facing the first substrate and a liquid crystal layer disposed between the first and second substrates. The first substrate includes a thin-film transistor ("TFT"), a first pixel electrode and a second pixel electrode.

The liquid crystal molecules, which are in the liquid crystal layer, may be implemented in a vertically aligned ("VA") mode, in which an electric field is applied between the first pixel electrode and the second pixel electrode. Specifically, when the electric field is not applied between the first pixel electrode and the second pixel electrode, the LCD panel may display a white image. When the electric field is applied between the first pixel electrode and the second pixel electrode, the LCD panel may display a black image.

More specifically, when the electric field is applied between the first pixel electrode and the second pixel electrode, the liquid crystal molecules of the liquid crystal layer are aligned in a direction substantially horizontal with respect to a plane defined by the first pixel electrode or the second pixel electrode. When the liquid crystal molecules are aligned in the horizontal direction, a contrast ratio of an image displayed on a front portion of the LCD panel is improved. However, a contrast ratio of an image displayed on, e.g., viewed from, a side portion of the LCD panel is substantially low, due to a phase of light emitted toward the side portion of the LCD panel, which is substantially delayed as it travels through the liquid crystal molecules along a thickness direction of the LCD panel.

Thus, the LCD panel operated in the vertical alignment mode has a reduced contrast ratio of an image viewed from a side of the LCD panel, due to a phase retardation along the thickness direction of the liquid crystal molecules of the LCD panel.

BRIEF SUMMARY OF THE INVENTION

An exemplary embodiment of the present invention includes an optical film assembly which substantially improves a side visibility thereof in a vertical alignment mode.

An exemplary embodiment includes a display device including the optical film assembly.

In an exemplary embodiment, an optical film assembly includes a first polarization plate, a second polarization plate, an A-plate and a negative C-plate. The first polarization plate is disposed below a liquid crystal layer and has a first absorption axis. The second polarization plate is disposed above the liquid crystal layer and has a second absorption axis substantially perpendicular to the first absorption axis. The A-plate is disposed between the first polarization plate and the second polarization plate. The negative C-plate is disposed between the first polarization plate and the second polarization plate. A thickness-direction phase retardation value of the negative C-plate is equal to or less than a value acquired by subtracting about 75 nanometers (nm) from a thickness-direction phase retardation value of the liquid crystal layer and the thickness-direction phase retardation value of the negative C-plate is equal to or greater than a value acquired by subtracting about 275 nm from the thickness-direction phase retardation value of the liquid crystal layer.

In an exemplary embodiment, a distance between the negative C-plate and the liquid crystal layer may be equal to or less than a distance between the A-plate and the liquid crystal layer.

In an exemplary embodiment of the present invention, the A-plate may be disposed between the liquid crystal layer and the second polarization plate, and the negative C-plate may be disposed between the liquid crystal layer and the first polarization plate. The A-plate may include a negative A-plate.

In an exemplary embodiment, the A-plate may be disposed between the liquid crystal layer and the first polarization plate, and the negative C-plate may be disposed between the liquid crystal layer and the A-plate. The A-plate may include a plurality of A-plates, where the plurality of A-plates includes at least one of a negative A-plate and a positive A-plate.

In an exemplary embodiment, the optical film assembly may include a plurality of A-plates. The plurality of A-plates may include at least one of a negative A-plate and a positive A-plate. The negative A-plate may be disposed between the liquid crystal layer and the second polarization plate. The negative C-plate may be disposed between the liquid crystal layer and the negative A-plate. The positive A-plate may be disposed between the liquid crystal layer and the first polarization plate.

In an exemplary embodiment, the optical film assembly may include a plurality of A-plates. The plurality of A-plates may include a positive A-plate and a negative A-plate. The positive A-plate is disposed between the liquid crystal layer and the second polarization plate. The negative A-plate is disposed between the liquid crystal layer and the first polarization plate. The negative C-plate is disposed between the liquid crystal layer and the negative A-plate.

In an exemplary embodiment, the A-plate may be disposed between the liquid crystal layer and the first polarization plate, and the negative C-plate may be disposed between the liquid crystal layer and the second polarization plate.

In an exemplary embodiment, the A-plate may be disposed between the liquid crystal layer and the second polarization plate, and the negative C-plate may be disposed between the liquid crystal layer and the A-plate.

In an exemplary embodiment, the A-plate may be disposed between the liquid crystal layer and the first polarization plate and an additional A-plate may be disposed between the liquid crystal layer and the second polarization plate. The negative C-plate may be disposed between the liquid crystal layer and the A-plate, and an additional negative C-plate may be disposed between the liquid crystal layer and the additional A-plate.

In an exemplary embodiment, a display device includes a display panel and an optical film assembly. The display panel includes a first substrate, a second substrate and a liquid crystal layer. The first substrate includes a first pixel electrode which receives a first voltage and a second pixel electrode which receives a second voltage. The second substrate is disposed opposite the first substrate. The liquid crystal layer is disposed between the first substrate and the second substrate. The optical film assembly includes a first polarization plate, a second polarization plate, an A-plate and a negative C-plate. The first polarization plate is disposed below the first substrate and has a first absorption axis. The second polarization plate is disposed above the second substrate and has a second absorption axis substantially perpendicular to the first absorption axis. The A-plate is disposed between the first polarization plate and the second polarization plate. The negative C-plate is disposed between the first polarization plate and the second polarization plate. The liquid crystal layer is substantially vertically aligned with respect to a plane defined by a surface of the first substrate when the first voltage is not applied to the first pixel electrode and the second voltage is not applied to the second pixel electrode. The liquid crystal layer is substantially horizontally aligned with respect to the plane defined by the surface of the first substrate when the first voltage is applied to the first pixel electrode and the second voltage is applied to the second pixel electrode. A thickness-direction phase retardation value of the negative C-plate is equal to or less than a value acquired by subtracting about 75 nm from a thickness-direction phase retardation value of the liquid crystal layer and the thickness-direction phase retardation value of the negative C-plate is equal to or greater than a value acquired by subtracting about 275 nm from the thickness-direction phase retardation value of the liquid crystal layer.

In an exemplary embodiment, a distance between the negative C-plate and the liquid crystal layer may be equal to or less than a distance between the A-plate and the liquid crystal layer.

In an exemplary embodiment, the first polarization plate may be disposed below the display panel, and the second polarization plate may be disposed above the display panel.

In an exemplary embodiment, the A-plate may further include a plurality of A-plates including at least one of a negative A-plate and a positive A-plate.

In an exemplary embodiment, the negative C-plate and the A-plate may change a polarization state of light, which is dispersed by the liquid crystal layer to correspond to an extinction point of a Poincare sphere.

In an exemplary embodiment, the thickness-direction phase retardation value of the liquid crystal layer may be in a range from about 220 nm to about 520 nm. The thickness-direction phase retardation value of the negative C-plate may be in a range from about 100 nm to about 400 nm. The thickness-direction phase retardation value of the A-plate may be in a range from about 60 nm to about 80 nm.

In an exemplary embodiment, the first pixel electrode and the second pixel electrode may respectively include a plurality of electrode bars so that the first pixel electrode and the second pixel electrode are disposed alternately. The first pixel electrode may be electrically connected to a data line receiving the first voltage. The second pixel electrode may be electrically connected to a power line receiving the second voltage.

In an exemplary embodiment of the present invention, an A-plate and the negative C-plate are disposed on a display panel, where a thickness-direction phase retardation value of the negative C-plate is equal to or less than a value acquired by subtracting about 75 nm from a thickness-direction phase retardation value of the liquid crystal layer, and a thickness-direction phase retardation value of the negative C-plate is equal to or greater than a value acquired by subtracting about 275 nm from a thickness-direction phase retardation value of the liquid crystal layer, and a polarization state of light dispersed by the liquid crystal layer is thereby changed to correspond to an extinction point of a Poincare sphere. Accordingly, a contrast ratio when viewed from a side of the display device is substantially increased.

BRIEF DESCRIPTION OF THE DRAWINGS

The above and other aspects, advantages and features of the present invention will become more apparent by describing in further detail exemplary embodiments thereof with reference to the accompanying drawings, in which.

DETAILED DESCRIPTION OF THE INVENTION

Figure 1:
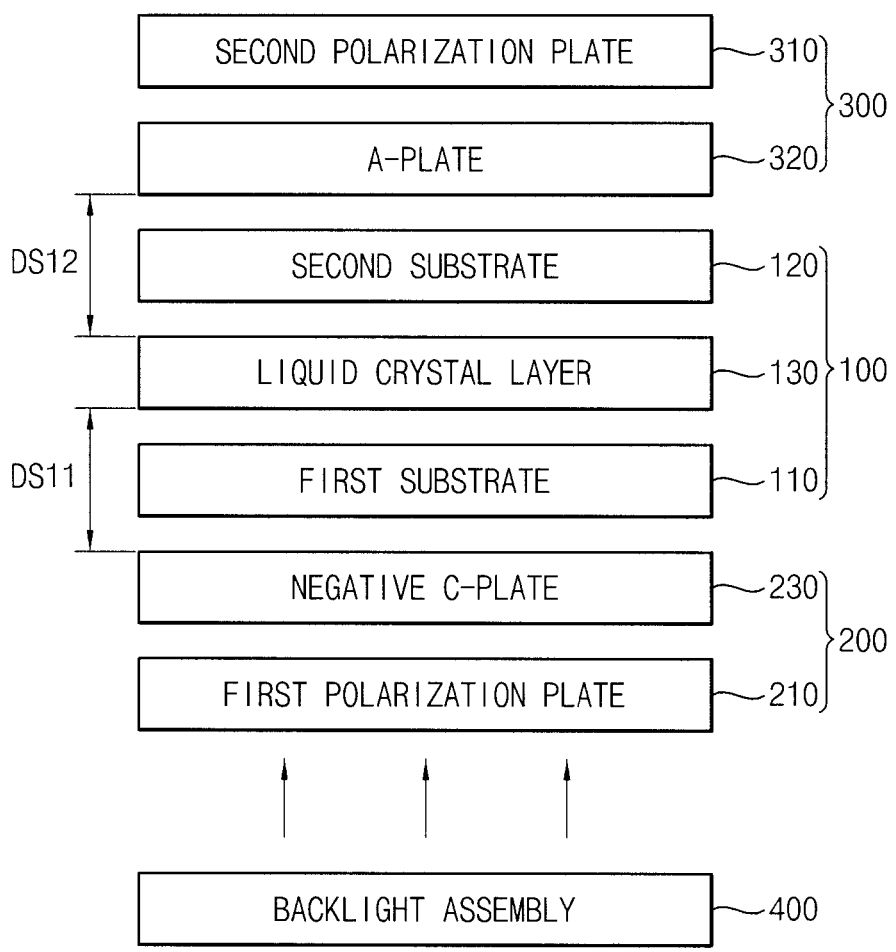
FIG. 1 is a partial cross-sectional view illustrating an exemplary embodiment of a display device according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims FIG. 1 is a partial cross-sectional view illustrating an exemplary embodiment of a display device according to the present invention.

Figure 2:
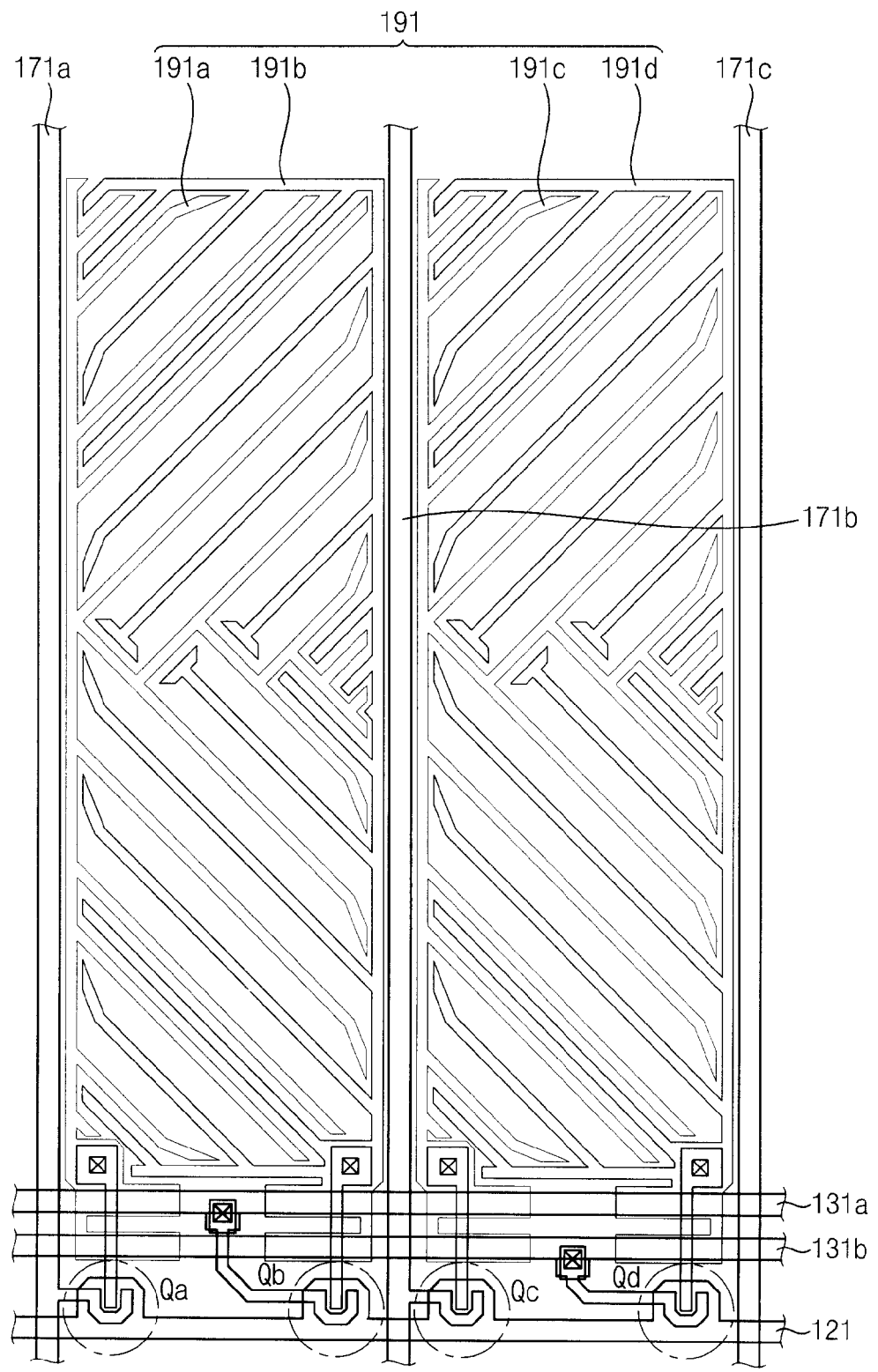
FIG. 2 is a plan view of a first substrate in the display device of FIG. 1.

FIG. 2 is a plan view of a first substrate in the display device of FIG. 1.

As shown in FIGS. 1 and 2, the display device includes a display panel 100, a first optical unit 200, a second optical unit 300 and a backlight unit 400, e.g., a backlight assembly 400, as shown in FIG. 1. Hereinafter, the first optical unit 200 and the second optical unit 300 are collectively referred to as an optical film assembly. The optical film assembly may change a polarization state of light provided from the backlight unit 400.

The display panel 100 includes a first substrate 110, a second substrate 120 disposed opposite to, e.g., facing, the first substrate 110, and a liquid crystal layer 130 disposed between the first substrate 110 and the second substrate 120.

The first substrate 110 includes a gate line 121, a first power line 131a and a second power line 131b. In addition, the first substrate 110 includes a first data line 171a, a second data line 171b and a third data line 171c that are substantially perpendicular to the gate line 121. In addition, the first substrate 110 further includes thin-film transistors ("TFTs"), e.g., a first TFT Qa, a second TFT Qb, a third TFT Qc and a fourth TFT Qd.

The gate line 121 is extended in a horizontal direction to transmit a gate signal.

The first power line 131a and the second power line 131b respectively receive a first power voltage and a second power voltage, and are extended in the longitudinal direction. The first and second power voltages may be different.

The first through third data lines 171a through 171c transmit data signals. The first and second data lines 171a and 171b may receive different voltages, and the second and third data lines 171b and 171c may receive different voltage.

The first and second data lines 171a and 171b are electrically connected to first and third pixel electrodes 191a and 191c through the first TFT Qa and the third TFT Qc, respectively.

In addition, the first and second power lines 131a and 131b are electrically connected to the second and fourth pixel electrodes 191b and 191d through the second TFT Qb and the fourth TFT Qd, respectively.

The first and second pixel electrodes 191a and 191b respectively include a plurality of electrode bars so that the first and second pixel electrodes 191a and 191b are disposed alternately. Therefore, the first and second pixel electrodes 191a and 191b may generate an electric field substantially parallel to a plane defined by a surface of the first substrate 110.

The third and fourth pixel electrodes 191c and 191d respectively include a plurality of electrode bars so that the third and fourth pixel electrodes 191c and 191d are disposed alternately. Therefore, the third and fourth pixel electrodes 191c and 191d may generate an electric field substantially parallel to the plane defined by the surface of the first substrate 110.

The second substrate 120 includes color filters (not shown) corresponding to the pixel electrodes 191. The color filters may include red color filters, green color filters and blue color filters. Accordingly, one of a red light, a green light and a blue light of a white light is transmitted through the associated red, green and blue color filters, respectively. In an exemplary embodiment, a red light component of a white light is transmitted through the red color filter, a green light component of the white light is transmitted through the green color filter and a blue light component of the white light is transmitted through the blue color filter.

The liquid crystal layer 130 is disposed between the first substrate 110 and the second substrate 120. The first pixel electrode 191a and the second pixel electrode 191b may generate an electric field substantially parallel to the plane defined by the surface of the first substrate 110 and the second substrate 120. In addition, the third pixel electrode 191c and the fourth pixel electrode 191d may generate an electric field substantially parallel to a plane defined by the surface of the first substrate 110 and the second substrate 120. When the electric field is generated in the liquid crystal layer 130, a longitudinal axis of liquid crystal molecules in the liquid crystal layer 130 is aligned to be inclined substantially parallel to the electric field. Accordingly, a change of polarization of incident light in the liquid crystal layer 130 is varied in accordance with an inclination amount of the liquid crystal molecules. That is, the liquid crystal molecules of the liquid crystal layer 130 may be substantially vertically aligned with respect to the plane defined by the surface of the first substrate 110 when voltages are not applied to the first and second substrates 110 and 120, and a horizontal electric field that is substantially parallel to the longitudinal direction of the first and second substrates 110 and 120 may be generated in the liquid crystal layer when the voltages are applied to the first and second substrates 110 and 120. The first optical unit 200 is disposed under the display panel 100. The first optical unit 200 includes optical films.

In an exemplary embodiment, the first optical unit 200 includes a first polarization plate 210 and a negative C-plate 230. The first polarization plate 210 is disposed under the display panel 100, and the negative C-plate 230 is disposed between the first polarization plate 210 and the first optical unit 200. Accordingly, the light generated from the backlight unit 400 disposed below the first polarization plate 210 passes through the first polarization plate 210 and the negative C-plate 230, and thereby proceeds to the display panel 100.

When the display panel 100 displays a black image, the negative C-plate 230 effectively prevents a light leakage at a side of the display panel 100 due to the liquid crystal molecules of the liquid crystal layer 130 that are in a vertical state regardless of domains of the display panel 100.

The second optical unit 300 includes optical films. In an exemplary embodiment, the second optical unit 300 is disposed above the display panel 100. The second optical unit 300 includes a second polarization plate 310 and an A-plate 320. The second polarization plate 310 is disposed above the display panel 100. The A-plate 320 is disposed between the second polarization plate 310 and the display panel 100.

In an exemplary embodiment, the negative C-plate 230 may be disposed opposite to, e.g., facing, the first substrate 110, and the A-plate 320 may be disposed opposite to, e.g., facing, the second polarization plate 310.

In an exemplary embodiment, a first distance DS11 between the negative C-plate 230 and the liquid crystal layer 130 may be substantially equal to a second distance DS12 between the A-plate 320 and the liquid crystal layer 130, but other exemplary embodiments are not limited thereto.

Figure 3:
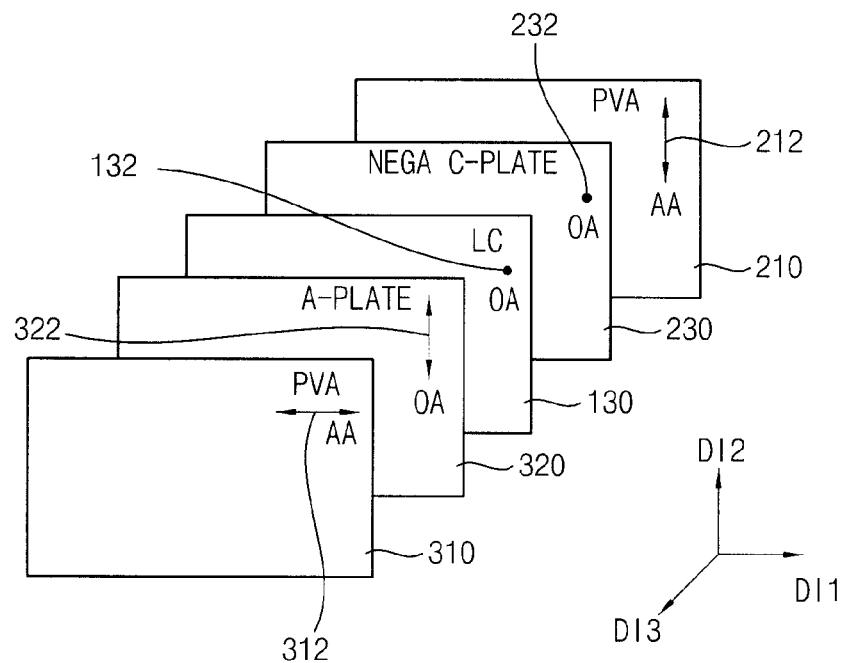
FIG. 3 is an exploded perspective view of optical films and a liquid crystal layer of the display device of FIG. 1.

FIG. 3 is an exploded perspective view of optical films and a liquid crystal layer of the display device of FIG. 1.

Referring to FIGS. 1 and 3, the first polarization plate 210 may include polyvinylalcohol ("PVA") and has a first absorption axis ("AA") 212 substantially parallel to a first direction DI1 and a first polarization axis (not shown) substantially parallel to a second direction DI2 that is substantially perpendicular to the first direction DI1. In an exemplary embodiment, light passing through the first polarization plate 210 is polarized in the second direction DI2, and a third direction DI3 represents a direction of the light, which is substantially perpendicular to at least one of the first direction DI1 and the second direction DI2.

The negative ("NEGA") C-plate 230 is disposed above the first polarization plate 210 and has an optical axis ("OA") 232 substantially parallel to the third direction DI3. A refractive index in an x-axis direction, a refractive index in a y-axis direction and a refractive index in a z-axis direction of the negative C-plate 230 may satisfy a numerical condition of "nx=ny>nz", where "nx" represents the refractive index in an x-axis direction, "ny" represents the refractive index in a y-axis direction, and "nz" represents the refractive index in a z-axis direction. The x-axis direction is substantially parallel to the first direction DI1, the y-axis direction is substantially parallel to the second direction DI2, and the z-axis direction is substantially parallel to the third direction DI3.

An in-plane phase retardation value Ro of the negative C-plate 230 is about zero (0) because nx is substantially equal to ny (nx=ny) and the in-plane phase retardation value Ro of the negative C-plate 230 is (nx−ny)×d, where "d" represents the thickness of the negative C-plate 230.

A thickness-direction phase retardation value Rth of the negative C-plate 230 is positive because nx and ny are greater than nz (nx=ny>nz) and the thickness-direction phase retardation value Rth of the negative C-plate 230 is [(nx+ny)/2−nz]×d.

The liquid crystal ("LC") layer 130 is disposed above the negative C-plate 230. The liquid crystal layer 130 may be operated in a vertical alignment mode. A refractive index of the liquid crystal layer 130 may be substantially opposite to the refractive index of the negative C-plate 230. The liquid crystal layer 130 may have an optical axis 132 substantially parallel to the third direction DI3. In an exemplary embodiment, a direction of the optical axis 132 of the liquid crystal layer 130 may be opposite to a direction of the optical axis 232 of the negative C-plate 230. A refractive index in an x-axis direction, a refractive index in a y-axis direction and a refractive index in a z-axis direction in the liquid crystal layer 130 may satisfy a numerical condition of "nx=ny<nz."

An in-plane phase retardation value Ro of the liquid crystal layer 130 is zero because nx of the liquid crystal layer 130 is equal to ny of the liquid crystal layer 130 (nx=ny). A thickness-direction phase retardation value Rth of the liquid crystal layer 130 is negative because nx of the liquid crystal layer 130 and ny of the liquid crystal layer 130 are less than nz of the liquid crystal layer 130 (nx=ny<nz). In an exemplary embodiment, the thickness-direction phase retardation value Rth of the liquid crystal layer 130 is [(nx+ny)/2−nz]×d, where "d" represents the thickness of the liquid crystal layer 130.

The A-plate 320 is disposed above the liquid crystal layer 130. The A-plate 320 has an optical axis 322 substantially parallel to the first direction DI1 and the first absorption axis 212 of the first polarization plate 210.

The A-plate 320 may be a negative A-plate 320 or a positive A-plate 320 or, in another exemplary embodiment, a plurality of A-plates 320 may include at least one negative A-plate and at least one positive A-plate.

The negative A-plate 320 may be a phase retardation film and have a thickness-direction phase retardation value Rth that satisfies one of a numerical condition of Rth≤0 and nx ny and a numerical condition of Rth≥0 and nx≠ny.

In an exemplary embodiment, the thickness-direction phase retardation value Rth of the A-plate 320 is [(nx+ny)/2−nz]×d, where "d" represents the thickness of the A-plate 320.

The second polarization plate 310 is disposed above the A-plate 320. The second polarization plate 310 has a second absorption axis 312 substantially parallel to the second direction DI2 and a second polarization axis (not shown) substantially parallel to the first direction DI1.

Figure 4:
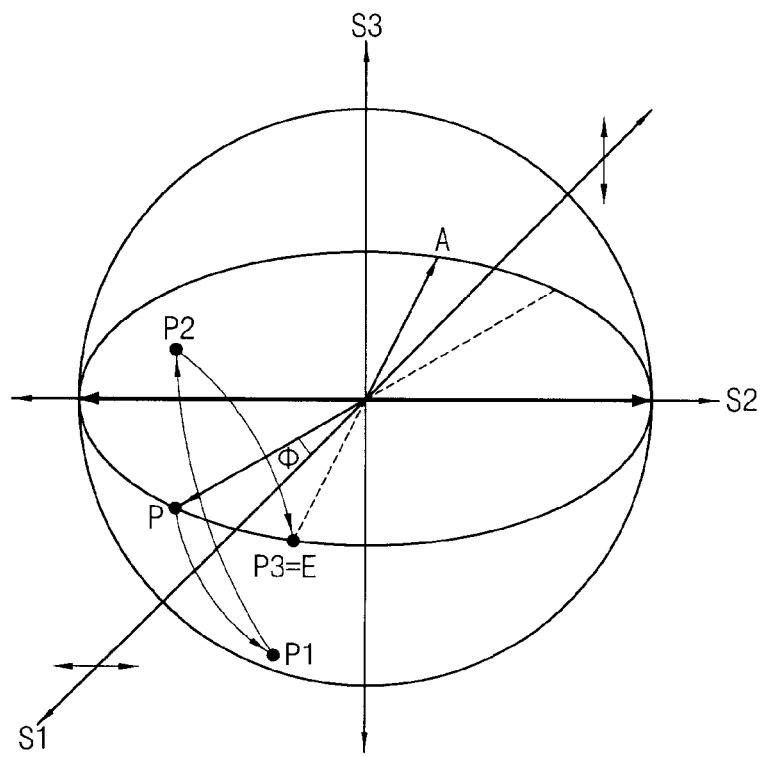
FIG. 4 is a Poincare sphere showing a polarization state of a light after passing through the optical films of FIG. 3.

FIG. 4 is a Poincare sphere showing a polarization state of a light after passing through the optical films of FIG. 2.

Referring now to FIGS. 3 and 4, the Poincare sphere has three coordinate axes, e.g., a first coordinate axis S1, a second coordinate axis S2 and a third coordinate axis S3. The Poincare sphere may describe a state of polarization of a light in three dimensions when the light is viewed from a side of a display device, for example, when observer views the display device at an azimuth angle of about 45 degrees and a polar angle of about 60 degrees with respect to a plane of the display device.

The optical axis 132 of the liquid crystal layer 130 is an axis of rotation in a direction of the second coordinate axis S2, and the optical axis 232 of the negative C-plate 230 is an axis of rotation in an opposite direction of the second coordinate axis S2.

The first polarization axis of the first polarization plate 210 (e.g., a lower-plate transmission axis P) is placed at a plane defined by the first and second coordinate axes S1 and S2. The first polarization axis of the first polarization plate 210 is inclined at an angle of Φ degrees in a clockwise direction with respect to the first coordinate axis S1. In an exemplary embodiment, Φ may be about 11.5 degrees. The lower-plate transmission axis P may be directed to an opposite direction of the first absorption axis 212.

The second polarization axis of the second polarization plate 310 (e.g., an upper-plate transmission axis A) is placed at a plane defined by the first and second coordinate axes S1 and S2, and the upper-plate transmission axis A and the lower-plate transmission axis P are symmetric with respect to the second coordinate axis S2. The lower-plate transmission axis A may be directed to an opposite direction of the second absorption axis 312.

The optical axis 322 of the A-plate 320 is placed at the plane defined by the first and second coordinate axes S1 and S2. In an exemplary embodiment, the optical axis of one of the positive A-plate and the negative A-plate may be substantially parallel to the first absorption axis 212.

In an exemplary embodiment, an extinction point E of the Poincare sphere is located in a direction of the second polarization axis of the second polarization plate 310. That is, the extinction point E of the Poincare sphere is located in an opposite direction of the upper-plate transmission axis A. The opposite direction of the upper-plate transmission axis A may be the second absorption axis 312.

The extinction point E may be a point corresponding to an ideal polarization state of light after passing through from the first polarization plate 210 to the A-plate 320. When a polarization state of the light having passed through from the first polarization plate 210 to the A-plate 320 is substantially identical to the extinction point, a contrast ratio when viewed from the side of the display device is substantially increased.

In FIG. 4, the polarization state of the light having passed through the first polarization plate 210 is labeled "P." The polarization state of the light having passed through the negative C-plate 230 is labeled "P1." The polarization state of the light having passed through the liquid crystal layer 130 is labeled "P2." The polarization state of the light having passed through the A-plate 320 is labeled "P3."

In an exemplary embodiment, when the A-plate 320 is the negative A-plate, the polarization state of P2 may move to P3, e.g., by rotating in a clockwise direction (as viewed in FIG. 4).

As shown in FIG. 4, it is recognized that P3 may be substantially identical to the extinction point E. Therefore, the contrast ratio when viewed from the side of the display device is substantially improved.

FIGS. 5A, 5B, 5C and 5D are graphs of luminance, in candelas per square meter (cd/m$^2$), versus aspect angle, in angular degrees (°), of a display panel in accordance with a phase retardation value in a thickness direction of the liquid crystal layer of FIG. 3 and a phase retardation value in a thickness direction of the optical films.

In an exemplary embodiment, a viewing angle is about 60 degrees.

Referring back to FIG. 3 and as shown in FIGS. 5A through 5D, the negative C-plate 230 and the A-plate 320 may satisfy the following conditions to obtain an optimum contrast ratio when viewed from a side of the display device. The thickness-direction phase retardation values of the negative C-plate 230 and the A-plate 320 with respect to a wavelength of the light have been adjusted, and distances between the extinction point and each polarization state of the light while passing through from the first polarization plate 210 to the A-plate 320 are thereby within about 0.1 nanometers (nm).

Figure 5A:
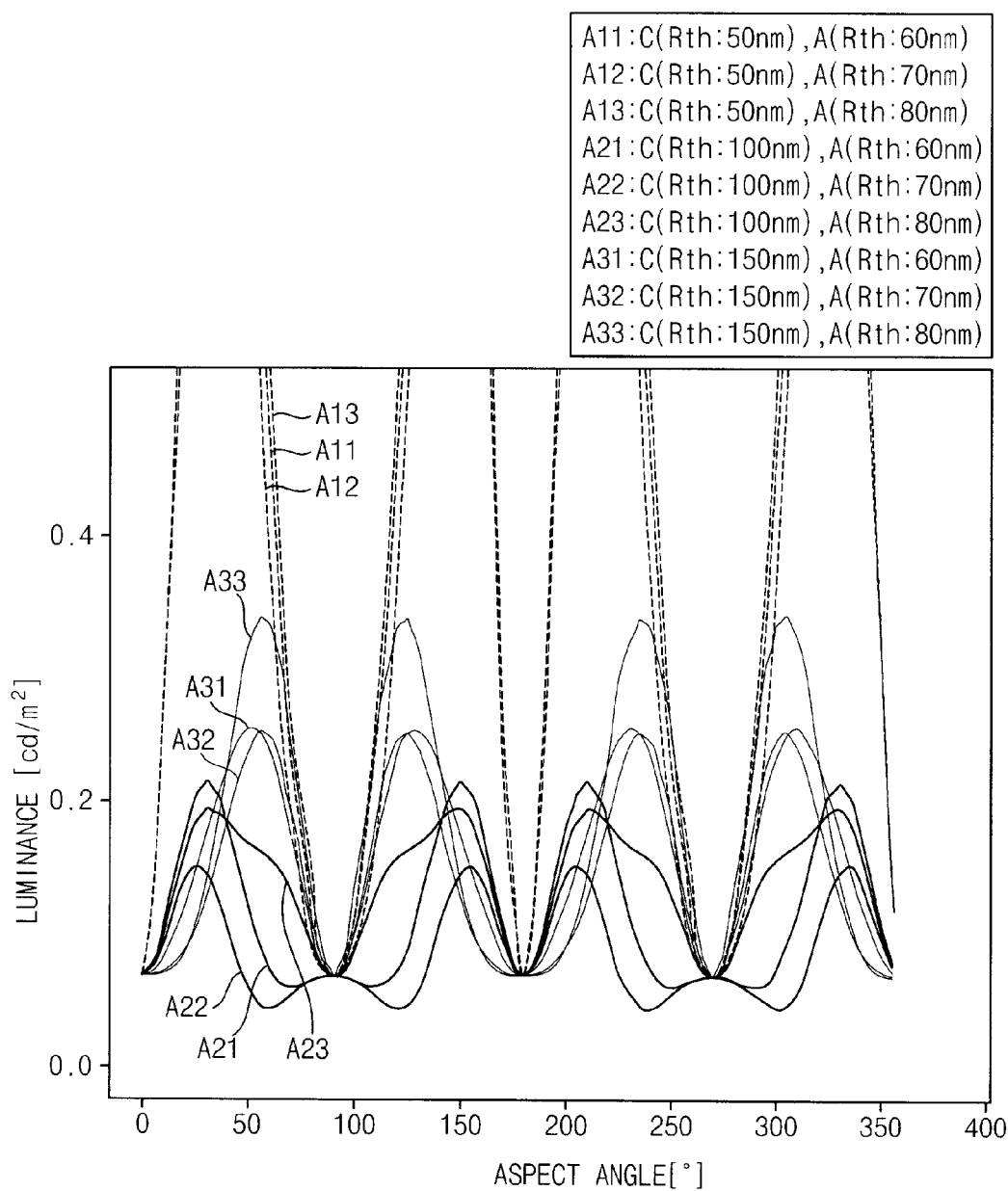
FIGS. 5A, 5B, 5C and 5D are graphs of luminance (in candelas per square meter) versus aspect angle (in angular degrees) of a display panel in accordance with a phase retardation value in a thickness direction of the liquid crystal layer and phase retardation values in thickness direction of the optical films of FIG. 3.

FIG. 5A is a graph of luminance versus aspect angle of the display device when the thickness-direction phase retardation value Rth of the liquid crystal layer 130 is about 230 nm.

As shown in FIG. 5A, when the thickness-direction phase retardation value Rth of the negative C-plate 230 is about 50 nm and the thickness-direction phase retardation value Rth of the A-plate 320 is about 60 nm, the luminance measured at different aspect angles may be represented by a curve "A11." The maximum luminance of the curve A11 may be in a range from about 0.6 cd/m$^2$ to about 1.0 cd/m$^2$.

When the thickness-direction phase retardation value Rth of the negative C-plate 230 is about 50 nm and the thickness-direction phase retardation value Rth of the A-plate 320 is about 70 nm, the luminance measured at different aspect angles may be represented by a curve "A12." The maximum luminance of the curve A12 may be in a range from about 0.6 cd/m$^2$ to about 1.0 cd/m$^2$ When the thickness-direction phase retardation value Rth of the negative C-plate 230 is about 50 nm and the thickness-direction phase retardation value Rth of the A-plate 320 is about 80 nm, the luminance measured at different aspect angles may be represented by a curve "A13." The maximum luminance of the curve A13 may be in a range from about 0.6 cd/m$^2$ to about 1.0 cd/m$^2$.

When the thickness-direction phase retardation value Rth of the negative C-plate 230 is about 100 nm and the thickness-direction phase retardation value Rth of the A-plate 320 is about 60 nm, the luminance measured at different aspect angles may be represented by a curve "A21." The maximum luminance of the curve A21 may be about 0.22 cd/m².

When the thickness-direction phase retardation value Rth of the negative C-plate 230 is about 100 nm and the thickness-direction phase retardation value Rth of the A-plate 320 is about 70 nm, the luminance measured at different aspect angles may be represented by a curve "A22." The maximum luminance of the curve A22 may be about 0.14 cd/m².

When the thickness-direction phase retardation value Rth of the negative C-plate 230 is about 100 nm and the thickness-direction phase retardation value Rth of the A-plate 320 is about 80 nm, the luminance measured at different aspect angles may be represented by a curve "A23." The maximum luminance of the curve A23 may be about 0.18 cd/m².

When the thickness-direction phase retardation value Rth of the negative C-plate 230 is about 150 nm and the thickness-direction phase retardation value Rth of the A-plate 320 is about 60 nm, the luminance measured at different aspect angles may be represented by a curve "A31." The maximum luminance of the curve A31 may be about 0.25 cd/m².

When the thickness-direction phase retardation value Rth of the negative C-plate 230 is about 150 nm and the thickness-direction phase retardation value Rth of the A-plate 320 is about 70 nm, the luminance measured at different aspect angles may be represented by a curve "A32." The maximum luminance of the curve A32 may be about 0.24 cd/m².

When the thickness-direction phase retardation value Rth of the negative C-plate 230 is about 150 nm and the thickness-direction phase retardation value Rth of the A-plate 320 is about 80 nm, the luminance measured at different aspect angles may be represented by a curve "A33." The maximum luminance of the curve A33 may be about 0.33 cd/m².

As shown in curves of FIG. 5A, a light leakage in a black state may occur at aspect angles of from about 22.5° to about 67.5°, from about 112.5° to about 157.5°, from about 202.5° to about 247.5° and from about 292.5° to about 337.5° in which the luminance is substantially high.

In a conventional display device that does not use optical films, a maximum luminance of the conventional display device at the viewing angle of 60° may be about 14.5 cd/m². In an exemplary embodiment, however, the maximum luminance of the curves A11, A12, A13, A21, A22, A23, A31, A32 and A33 are equal to or less than about 1.0 cd/m², and the light leakage from the side of the display panel is thereby substantially reduced. As described above, the maximum luminance of curve A22 is the smallest among the maximum luminance values of the curves shown in FIG. 5A. Accordingly, the light leakage at the side of the display panel may be reduced efficiently when the thickness-direction phase retardation value Rth of the negative C-plate 230 is about 100 nm and the thickness-direction phase retardation value Rth of the A-plate 320 is about 70 nm.

As shown in FIG. 5A, the light leakage from the side of the display panel may be affected more by a change of the thickness-direction phase retardation value Rth of the negative C-plate 230 than by a change of the thickness-direction phase retardation value Rth of the A-plate 320.

Figure 5B:
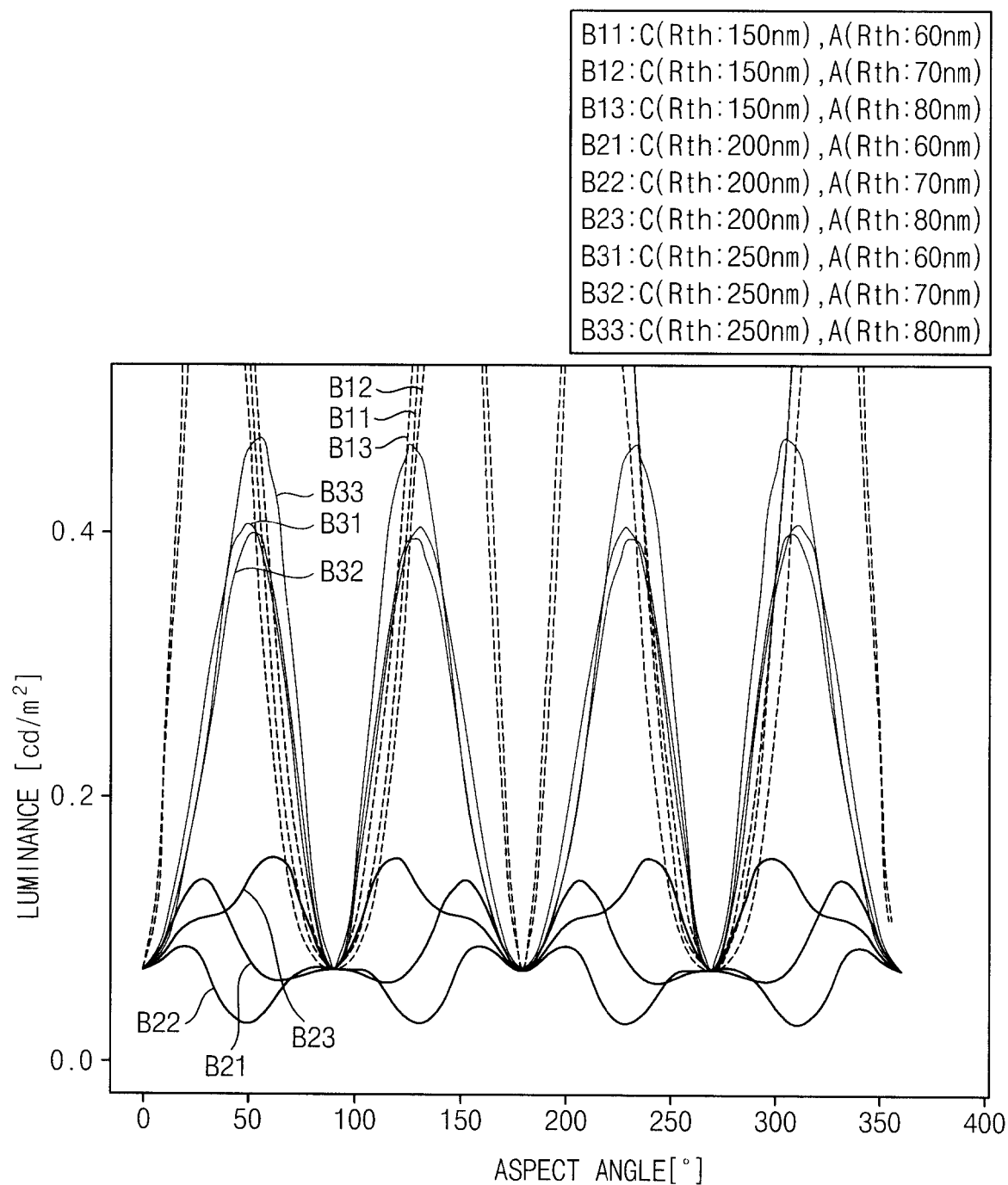

FIG. 5B is a graph of luminance versus aspect angle of the display device when the thickness-direction phase retardation value Rth of the liquid crystal layer 130 is 320 nm.

As shown in FIG. 5B, when the thickness-direction phase retardation value Rth of the negative C-plate 230 is about 150 nm and the thickness-direction phase retardation value Rth of the A-plate 320 is about 60 nm, the luminance measured at different aspect angles may be represented by a curve "B11." The maximum luminance of the curve B11 may be in a range from about 0.6 cd/m² to about 1.0 cd/m².

When the thickness-direction phase retardation value Rth of the negative C-plate 230 is about 150 nm and the thickness-direction phase retardation value Rth of the A-plate 320 is about 70 nm, the luminance measured at different aspect angles may be represented by a curve "B12." The maximum luminance of the curve B12 may be in a range from about 0.6 cd/m² to about 1.0 cd/m².

When the thickness-direction phase retardation value Rth of the negative C-plate 230 is about 150 nm and the thickness-direction phase retardation value Rth of the A-plate 320 is about 80 nm, the luminance measured at different aspect angles may be represented by a curve "B13." The maximum luminance of the curve B13 may be in a range from about 0.6 cd/m² to about 1.0 cd/m².

When the thickness-direction phase retardation value Rth of the negative C-plate 230 is about 200 nm and the thickness-direction phase retardation value Rth of the A-plate 320 is about 60 nm, the luminance measured at different aspect angles may be represented by a curve "B21." The maximum luminance of the curve B21 may be about 0.13 cd/m².

When the thickness-direction phase retardation value Rth of the negative C-plate 230 is about 200 nm and the thickness-direction phase retardation value Rth of the A-plate 320 is about 70 nm, the luminance measured at different aspect angles may be represented by a curve "B22." The maximum luminance of the curve B22 may be about 0.08 cd/m².

When the thickness-direction phase retardation value Rth of the negative C-plate 230 is about 200 nm and the thickness-direction phase retardation value Rth of the A-plate 320 is about 80 nm, the luminance measured at different aspect angles may be represented by a curve "B23." The maximum luminance of the curve B23 may be about 0.15 cd/m².

When the thickness-direction phase retardation value Rth of the negative C-plate 230 is about 250 nm and the thickness-direction phase retardation value Rth of the A-plate 320 is about 60 nm, the luminance measured at different aspect angles may be represented by a curve "B31." The maximum luminance of the curve B31 may be about 0.40 cd/m².

When the thickness-direction phase retardation value Rth of the negative C-plate 230 is about 250 nm and the thickness-direction phase retardation value Rth of the A-plate 320 is about 70 nm, the luminance measured at different aspect angles may be represented by a curve "B32." The maximum luminance of the curve B32 may be about 0.39 cd/m².

When the thickness-direction phase retardation value Rth of the negative C-plate 230 is about 250 nm and the thickness-direction phase retardation value Rth of the A-plate 320 is about 80 nm, the luminance measured at different aspect angles may be represented by a curve "B33." The maximum luminance of the curve B33 may be about 0.46 cd/m².

As shown in the curves of FIG. 5B, a light leakage in a black state may occur at aspect angles of from about 22.5° to about 67.5°, from about 112.5° to about 157.5°, from about 202.5° to about 247.5° and from about 292.5° to about 337.5° in which the luminance is high.

In a conventional display device that does not use optical films, a maximum luminance of the conventional display device at the viewing angle of 60° may be about 14.5 cd/m². In an exemplary embodiment, however, the maximum luminance of the curves B11, B12, B13, B21, B22, B23, B31, B32 and B33 may be equal to or less than about 1.0 cd/m², and the light leakage at the side of the display panel is thereby substantially reduced. As described above, the maximum luminance of the curve B22 is the smallest among the maximum luminance values of the curves in FIG. 5B. Accordingly, the light leakage at the side of the display panel may be reduced efficiently when the thickness-direction phase retardation value Rth of the negative C-plate 230 is about 200 nm and the thickness-direction phase retardation value Rth of the A-plate 320 is about 70 nm.

Figure 5C:
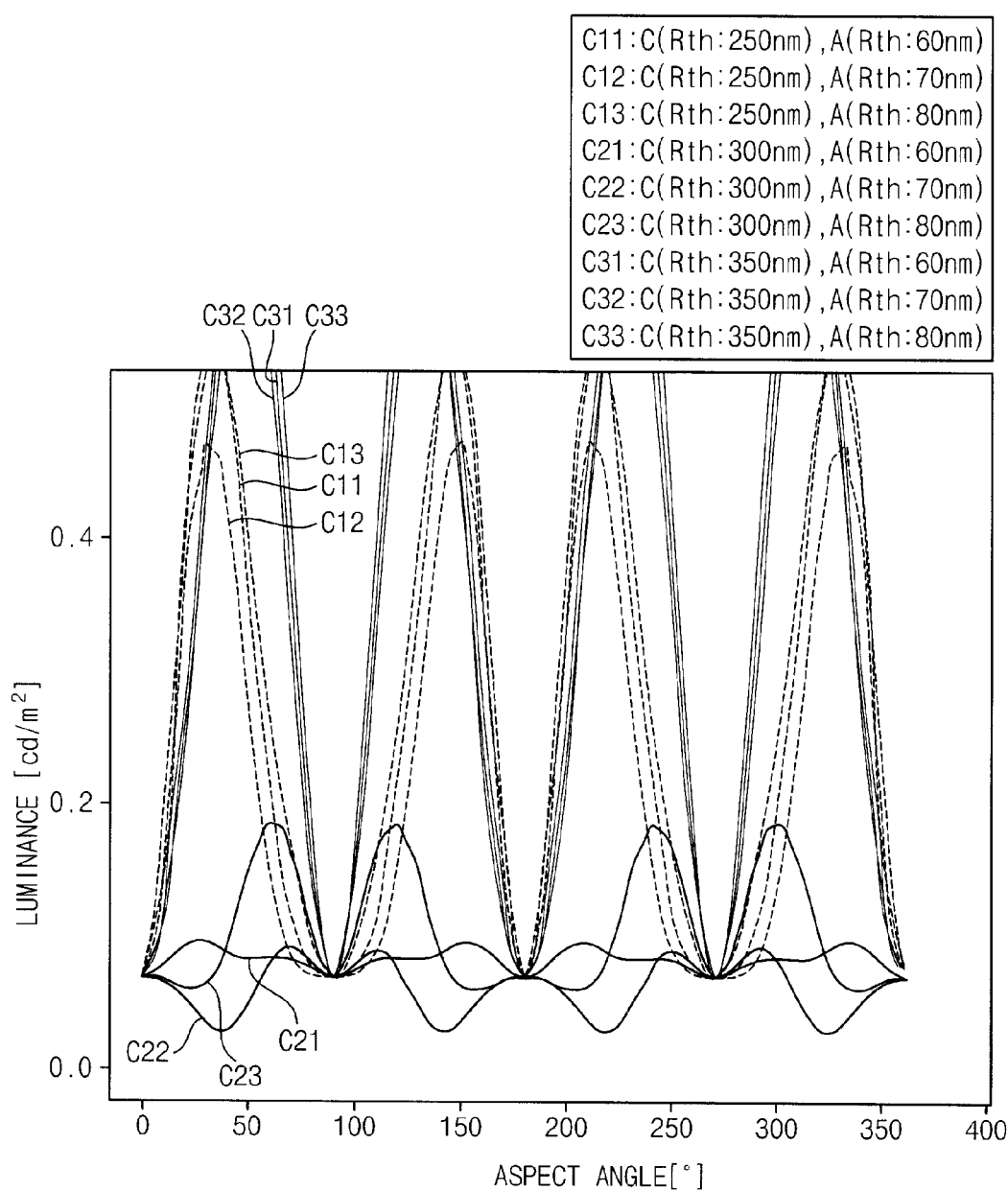

FIG. 5C is a graph of luminance versus aspect angle of the display device when the thickness-direction phase retardation value Rth of the liquid crystal layer 130 is 420 nm.

As shown in FIG. 5C, when the thickness-direction phase retardation value Rth of the negative C-plate 230 is 250 nm and the thickness-direction phase retardation value Rth of the A-plate 320 is 60 nm, the luminance measured at different aspect angles may be represented by a curve "C11." The maximum luminance of the curve C11 may be about 0.55 cd/m$^2$.

When the thickness-direction phase retardation value Rth of the negative C-plate 230 is about 250 nm and the thickness-direction phase retardation value Rth of the A-plate 320 is about 70 nm, the luminance measured at different aspect angles may be represented by a curve "C12." The maximum luminance of the curve C12 may be about 0.48 cd/m$^2$.

When the thickness-direction phase retardation value Rth of the negative C-plate 230 is about 250 nm and the thickness-direction phase retardation value Rth of the A-plate 320 is about 80 nm, the luminance measured at different aspect angles may be represented by a curve "C13." The maximum luminance of the curve C13 may be about 0.55 cd/m$^2$.

When the thickness-direction phase retardation value Rth of the negative C-plate 230 is 300 nm and the thickness-direction phase retardation value Rth of the A-plate 320 is 60 nm, the luminance measured according to the aspect angle may be represented by a curve "C21." The maximum luminance of the curve C21 may be about 0.09 cd/m$^2$.

When the thickness-direction phase retardation value Rth of the negative C-plate 230 is 300 nm and the thickness-direction phase retardation value Rth of the A-plate 320 is 70 nm, the luminance measured according to the aspect angle may be represented by a curve "C22." A maximum luminance of C22 may be about 0.08 cd/m$^2$.

When the thickness-direction phase retardation value Rth of the negative C-plate 230 is 300 nm and the thickness-direction phase retardation value Rth of the A-plate 320 is 80 nm, the luminance measured at different aspect angles may be represented by a curve "C23." The maximum luminance of the curve C23 may be about 0.18 cd/m$^2$.

When the thickness-direction phase retardation value Rth of the negative C-plate 230 is 350 nm and the thickness-direction phase retardation value Rth of the A-plate 320 is 60 nm, the luminance measured at different aspect angles may be represented by a curve "C31." The maximum luminance of the curve C31 may be in a range from about 0.6 cd/m$^2$ to about 1.0 cd/m$^2$.

When the thickness-direction phase retardation value Rth of the negative C-plate 230 is 350 nm and the thickness-direction phase retardation value Rth of the A-plate 320 is 70 nm, the luminance measured at different aspect angles may be represented by a curve "C32." The maximum luminance of the curve C32 may be from in a range about 0.6 cd/m$^2$ to about 1.0 cd/m$^2$.

When the thickness-direction phase retardation value Rth of the negative C-plate 230 is 350 nm and the thickness-direction phase retardation value Rth of the A-plate 320 is 80 nm, the luminance measured at different aspect angles may be represented by a curve "C33." The maximum luminance of the curve C33 may be in a range from about 0.6 cd/m$^2$ to about 1.0 cd/m$^2$.

As shown in the curves of FIG. 5C, a light leakage in a black state may occur at aspect angles of from about 22.5° to about 67.5°, from about 112.5° to about 157.5°, from about 202.5° to about 247.5° and from about 292.5° to about 337.5° in which the luminance is high.

In a conventional display device that does not use optical films, a maximum luminance of the conventional display device at the viewing angle of 60° is about 14.5 cd/m$^2$. In an exemplary embodiment, the maximum luminance of the curves C11, C12, C13, C21, C22, C23, C31, C32 and C33 may be equal to or less than about 1.0 cd/m$^2$, and the light leakage at the side of the display panel is thereby substantially reduced. As described above, the maximum luminance of the curve C22 is the smallest among the maximum luminance values of the curves of FIG. 5C. Accordingly, the light leakage at the side of the display panel may be reduced efficiently when the thickness-direction phase retardation value Rth of the negative C-plate 230 is about 300 nm and the thickness-direction phase retardation value Rth of the A-plate 320 is about 70 nm.

Figure 5D:
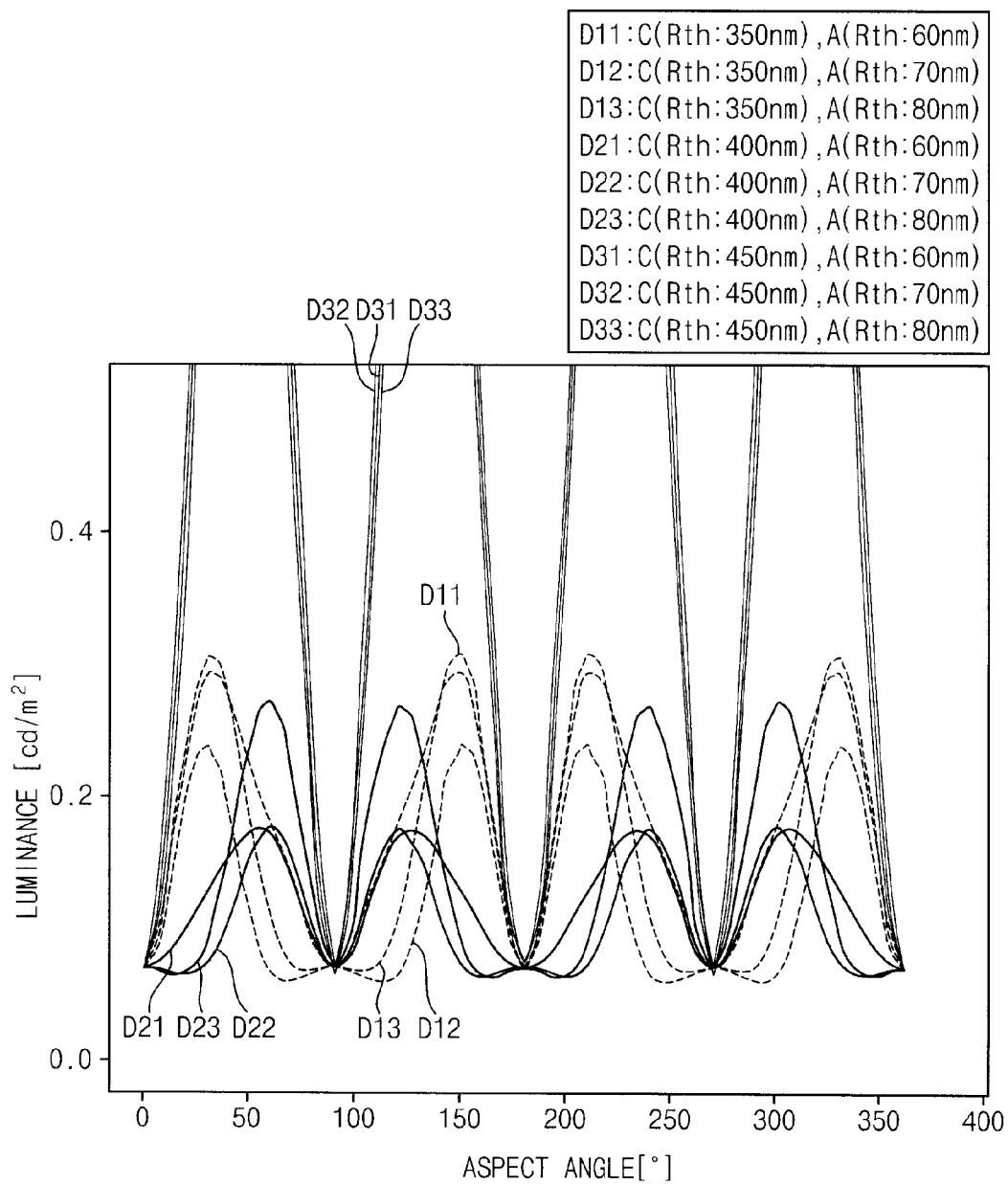

FIG. 5D is a graph of luminance versus aspect angle of the display device when the thickness-direction phase retardation value Rth of the liquid crystal layer 130 is 520 nm.

As shown in FIG. 5D, when the thickness-direction phase retardation value Rth of the negative C-plate 230 is about 350 nm and the thickness-direction phase retardation value Rth of the A-plate 320 is about 60 nm, the luminance measured at different aspect angles may be represented by a curve "D11." The maximum luminance of the curve D11 may be about 0.3 cd/m$^2$.

When the thickness-direction phase retardation value Rth of the negative C-plate 230 is about 350 nm and the thickness-direction phase retardation value Rth of the A-plate 320 is about 70 nm, the luminance measured at different aspect angles may be represented by a curve "D12." The maximum luminance of the curve D12 may be about 0.23 cd/m$^2$.

When the thickness-direction phase retardation value Rth of the negative C-plate 230 is about 350 nm and the thickness-direction phase retardation value Rth of the A-plate 320 is about 80 nm, the luminance measured at different aspect angles may be represented by a curve "D13." The maximum luminance of the curve D13 may be about 0.29 cd/m$^2$.

When the thickness-direction phase retardation value Rth of the negative C-plate 230 is about 400 nm and the thickness-direction phase retardation value Rth of the A-plate 320 is about 60 nm, the luminance measured at different aspect angles may be represented by a curve "D21." The maximum luminance of the curve D21 may be about 0.17 cd/m$^2$.

When the thickness-direction phase retardation value Rth of the negative C-plate 230 is about 400 nm and the thickness-direction phase retardation value Rth of the A-plate 320 is about 70 nm, the luminance measured at different aspect angles may be represented by a curve "D22." The maximum luminance of the curve D22 may be about 0.17 cd/m$^2$.

When the thickness-direction phase retardation value Rth of the negative C-plate 230 is about 400 nm and the thickness-direction phase retardation value Rth of the A-plate 320 is about 80 nm, the luminance measured at different aspect angles may be represented by a curve "D23." The maximum luminance of the curve D23 may be about 0.27 cd/m$^2$.

When the thickness-direction phase retardation value Rth of the negative C-plate 230 is about 450 nm and the thickness-direction phase retardation value Rth of the A-plate 320 is about 60 nm, the luminance measured at different aspect angles may be represented by a curve "D31." The maximum luminance of the curve D31 may be in a range from about 0.6 cd/m$^2$ to about 1.0 cd/m$^2$.

When the thickness-direction phase retardation value Rth of the negative C-plate 230 is about 450 nm and the thickness-direction phase retardation value Rth of the A-plate 320 is about 70 nm, the luminance measured at different aspect angles may be represented by a curve "D32." The maximum luminance of the curve D32 may be in a range from about 0.6 cd/m² to about 1.0 cd/m².

When the thickness-direction phase retardation value Rth of the negative C-plate 230 is about 450 nm and the thickness-direction phase retardation value Rth of the A-plate 320 is about 80 nm, the luminance measured at different aspect angles may be represented by a curve "D33." The maximum luminance of the curve D33 may be in a range from about 0.6 cd/m² to about 1.0 cd/m².

As shown in the curves of FIG. 5D, a light leakage in a black state may occur at aspect angles of from about 22.5° to about 67.5°, from about 112.5° to about 157.5°, from about 202.5° to about 247.5° and from about 292.5° to about 337.5° in which the luminance is substantially high.

In a conventional display device that does not use optical films, a maximum luminance of the conventional display device at the viewing angle of 60° may be about 14.5 cd/m². In an exemplary embodiment, the maximum luminance of the curves D11, D12, D13, D21, D22, D23, D31, D32 and D33 may be equal to or less than about 1.0 cd/m², and the light leakage at the side of the display panel is thereby substantially reduced. As described above, the maximum luminance of curves D21 and D22 is the smallest among the maximum luminance values of the curves of FIG. 5D. Accordingly, the light leakage at the side of the display panel may be reduced efficiently when the thickness-direction phase retardation value Rth of the negative C-plate 230 is about 400 nm and the thickness-direction phase retardation value Rth of the A-plate 320 is about 60 nm or about 70 nm.

As shown in FIGS. 5A to 5D, when an optimum value acquired by subtracting thickness-direction phase retardation value Rth of the liquid crystal layer 130 from the thickness-direction phase retardation value Rth of the negative C-plate 230 is in a range from about 70 nm to about 170 nm, the light leakage at the side of the display panel is substantially efficiently reduced. In an exemplary embodiment, the thickness-direction phase retardation value Rth of the negative C-plate 230 is substantially equal to or less than a value acquired by subtracting about 75 nm from a thickness-direction phase retardation value Rth of the liquid crystal layer 130, and is substantially equal to or greater than a value acquired by subtracting about 170 nm from the thickness-direction phase retardation value of the liquid crystal layer 130

In an exemplary embodiment, when the optimum value is about 120 nm, the light leakage at the side of the display panel is substantially efficiently reduced.

In an exemplary embodiment, the light leakage at the side of the display panel is substantially efficiently reduced when the thickness-direction phase retardation value of the liquid crystal layer 130 is in a rage from about 220 nm to about 520 nm, the thickness-direction phase retardation value of the negative C-plate 230 is in a rage from about 100 nm to about 400 nm, and the thickness-direction phase retardation value of the A-plate 320 is in a rage from about 60 nm to about 80 nm.

Although not shown in the drawings, to obtain an optimum value which reduces the light leakage most efficiently, the thickness-direction phase retardation value Rth of the liquid crystal layer 130 may be in a range from about 220 nm to about 520 nm, the thickness-direction phase retardation value Rth of the negative C-plate 230 may be in a range from about 25 nm to about 150 nm, and the thickness-direction phase retardation value Rth of the A-plate 320 may be about 50 nm.

The optimum value divided by a green light wavelength may be in a range of about 0.127 to about 0.310 where the green light wavelength may be about 550 nm.

In an exemplary embodiment, the display device includes the negative C-plate 230 and the A-plate 320. When the negative C-plate 230, which has a thickness-direction phase retardation value equal to or less than a value acquired by subtracting about 75 nm from a thickness-direction phase retardation value of the liquid crystal layer, and equal to or greater than a value acquired by subtracting about 275 nm from the thickness-direction phase retardation value of the liquid crystal layer, is disposed substantially adjacent to the liquid crystal layer 130, the light leakage may be substantially reduced, and a contrast ratio ("CR") is thereby substantially increased when viewed from a side of the display device.

Figure 6:
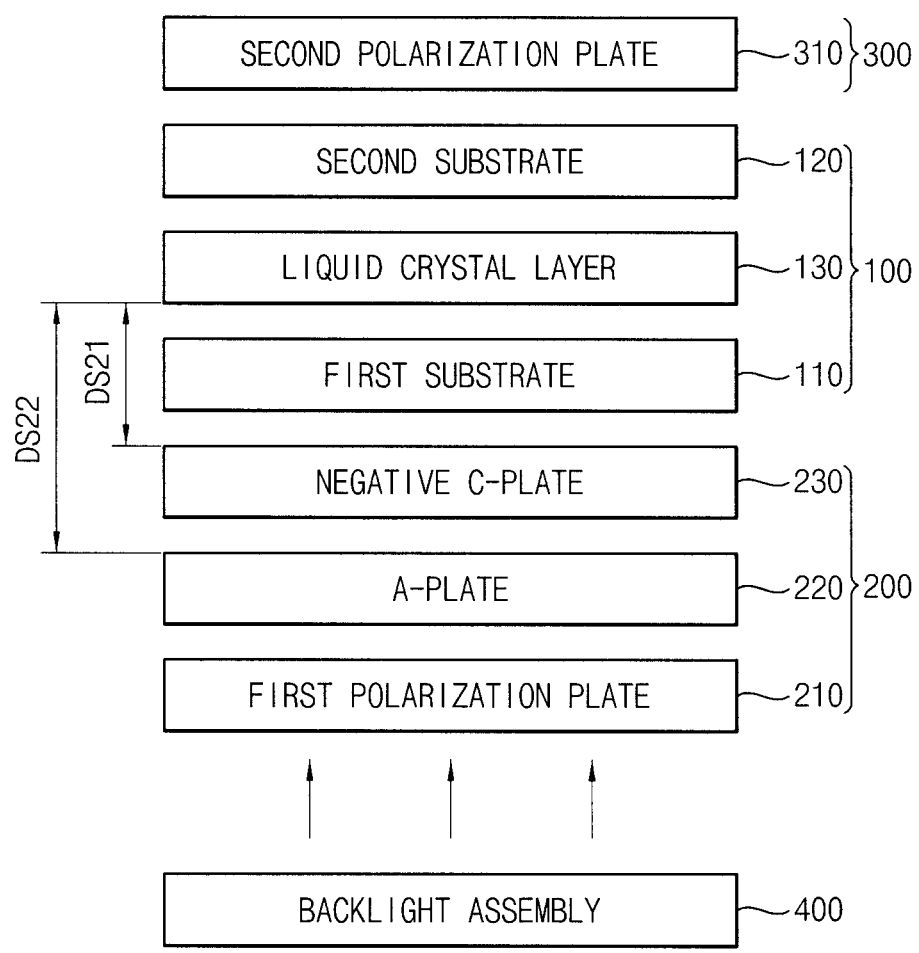
FIG. 6 is a partial cross-sectional view illustrating an exemplary embodiment of a display device according to the present invention.

FIG. 6 is a schematic partial cross-sectional view illustrating an exemplary embodiment of a display device according to the present invention.

Figure 7:
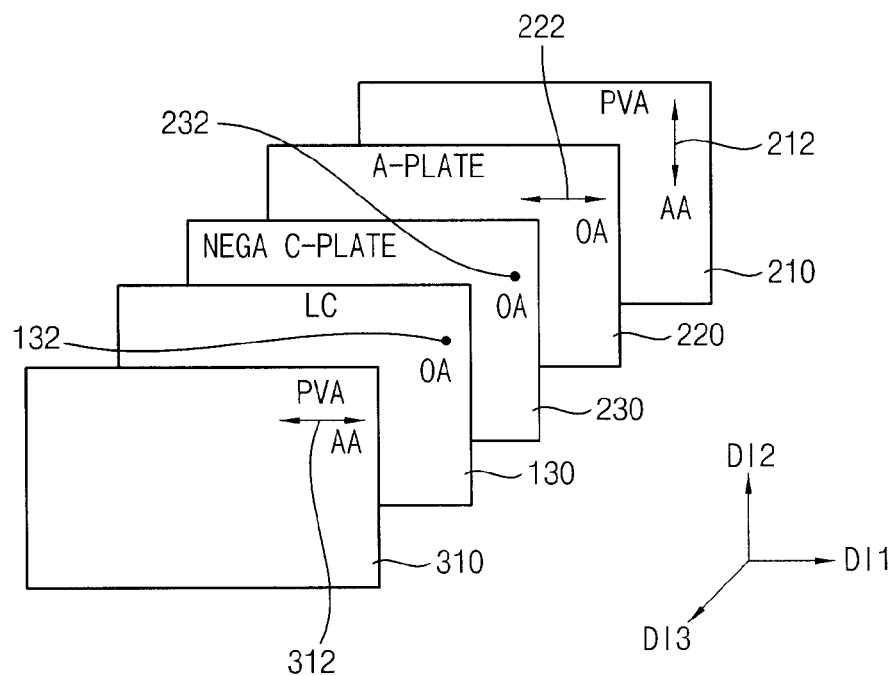
FIG. 7 is an exploded perspective view of optical films and a liquid crystal layer of the display device of FIG. 6.

FIG. 7 is a conceptual diagram showing a relationship among optical films and a liquid crystal layer of the display device of FIG. 6.

The display device in FIGS. 6 and 7 is substantially the same as the display device shown in FIGS. 1 and 3 except that an A-plate 220 is disposed between the negative C-plate 230 and the first polarization plate 210. The same or like elements shown in FIGS. 6 and 7 have been labeled with the same reference characters as used above to describe the exemplary embodiments of the display device shown in FIGS. 1 and 3, and any repetitive detailed description thereof will hereinafter be omitted or simplified.

Referring back to FIG. 3 and as shown in FIGS. 6 and 7, the first optical unit 200 includes optical films, for example, the first polarization plate 210, the A-plate 220 and the negative C-plate 230. The first polarization plate 210 is disposed below the display panel 100, the A-plate 220 is disposed between the first polarization plate 210 and the display panel 100, and the negative C-plate 230 is disposed between the A-plate 220 and the display panel 100. Accordingly, a light generated from the backlight unit 400 disposed below the first polarization plate 210 passes through the first polarization plate 210, the A-plate 220 and the negative C-plate 230, and thereby proceeds to the display panel 100.

The second optical unit 300 includes an optical film, for example, the second polarization plate 310 disposed above the display panel 100.

The A-plate 220 may be either a negative A-plate or a positive A-plate, and another exemplary embodiment may include a plurality of A-plates 220 including at least one each of a negative A-plate and a positive A-plate.

The A-plate 220 is disposed above the first polarization plate 210. The A-plate 220 has an optical axis 222 substantially parallel to the second direction DI2 and to the second absorption axis 312 of the second polarization plate 310.

The negative C-plate 230 is disposed above the second substrate 120 in a direction of the light, and has the optical axis 232 substantially parallel to the third direction DI3. The refractive index in the x-axis direction, the refractive index in the y-axis direction and the refractive index in the z-axis direction of the negative C-plate 230 may satisfy a numerical condition of "nx=ny>nz," where "nx" represents the refractive index in the x-axis direction, "ny" represents the refractive index in the y-axis direction, and "nz" represents the refractive index in the z-axis direction. In an exemplary embodiment, the x-axis direction is substantially parallel to the first direction DI1, the y-axis direction is substantially parallel to the second direction DI2, and the z-axis direction is substantially parallel to the third direction DI3.

The in-plane phase retardation value Ro of the negative C-plate 230 is about zero because nx is substantially equal to ny (nx=ny) and the in-plane phase retardation value Ro of the negative C-plate 230 is (nx−ny)×d, where "d" represents the thickness of the negative C-plate 230.

A thickness-direction phase retardation value Rth of the negative C-plate 230 is positive because nx and ny are greater than nz (nx=ny>nz) and the thickness-direction phase retardation value (Rth) of the negative C-plate 230 is [(nx+ny)/2−nz]×d.

The A-plate 220 is disposed opposite, e.g., facing, the first polarization plate 210. The negative C-plate 230 is disposed opposite, e.g., facing, the first substrate 110.

In an exemplary embodiment, a third distance DS21 between the negative C-plate 230 and the liquid crystal layer 130 may be less than a fourth distance DS22 between the A-plate 220 and the liquid crystal layer 130.

Figure 8:
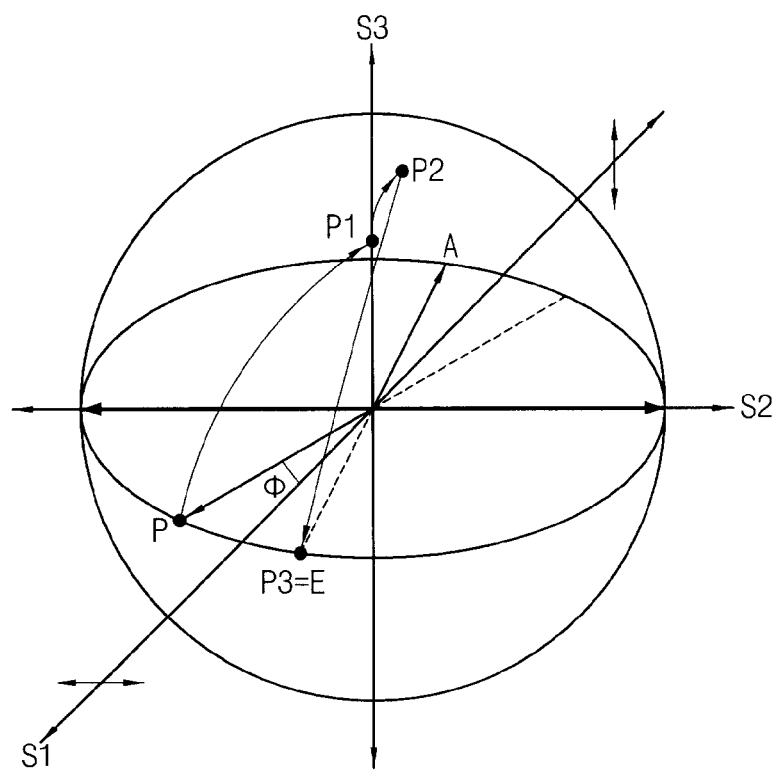
FIG. 8 is a Poincare sphere showing a polarization state of a light after passing through the optical films of FIG. 7.
Figure 9A:
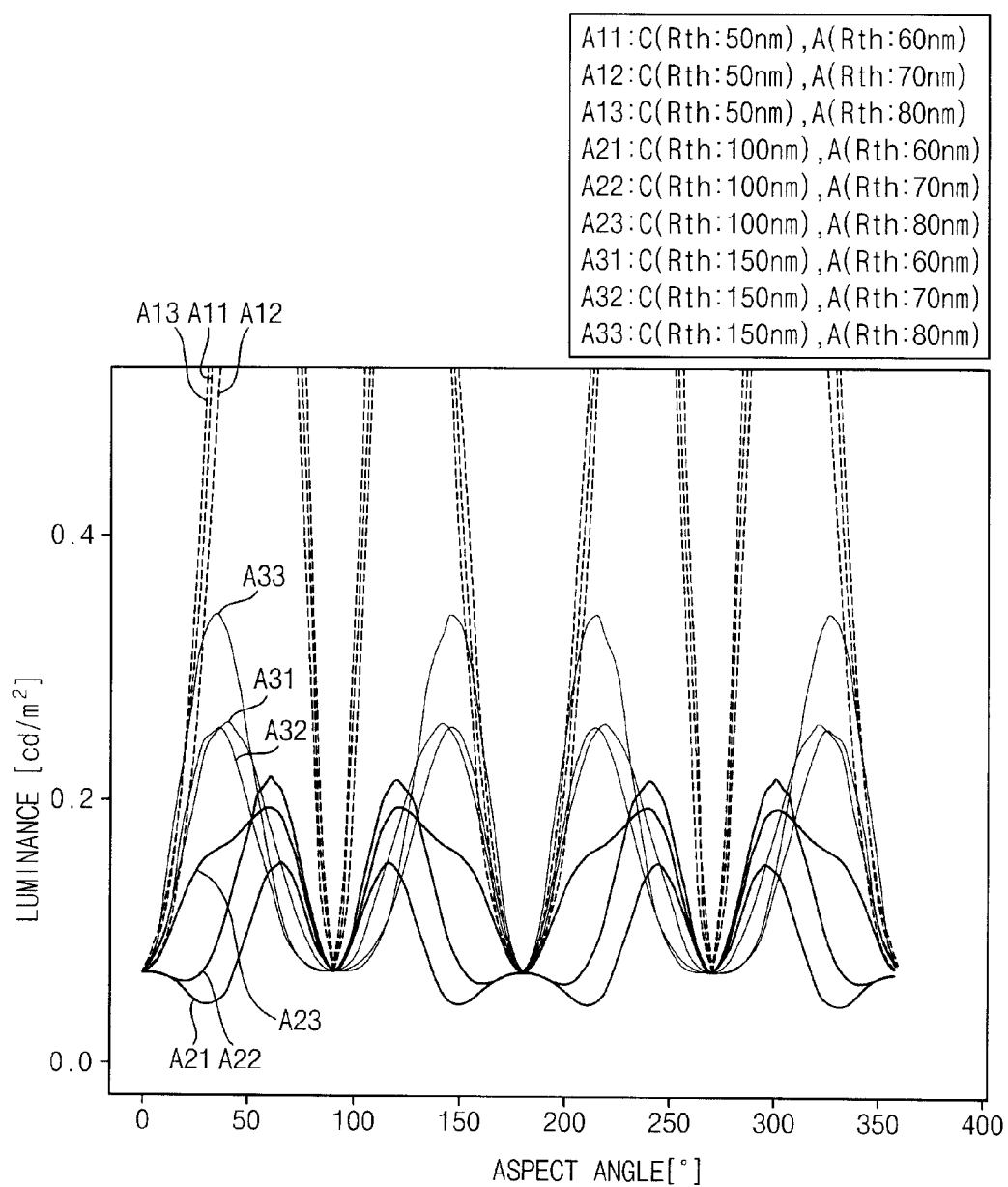
FIGS. 9A, 9B, 9C and 9D are graphs of luminance (in candelas per square meter) versus aspect angle (in angular degrees) of a display panel in accordance with a phase retardation value in a thickness direction of the liquid crystal layer and phase retardation values in a thickness direction of the optical films of FIG. 7.
Figure 9B:
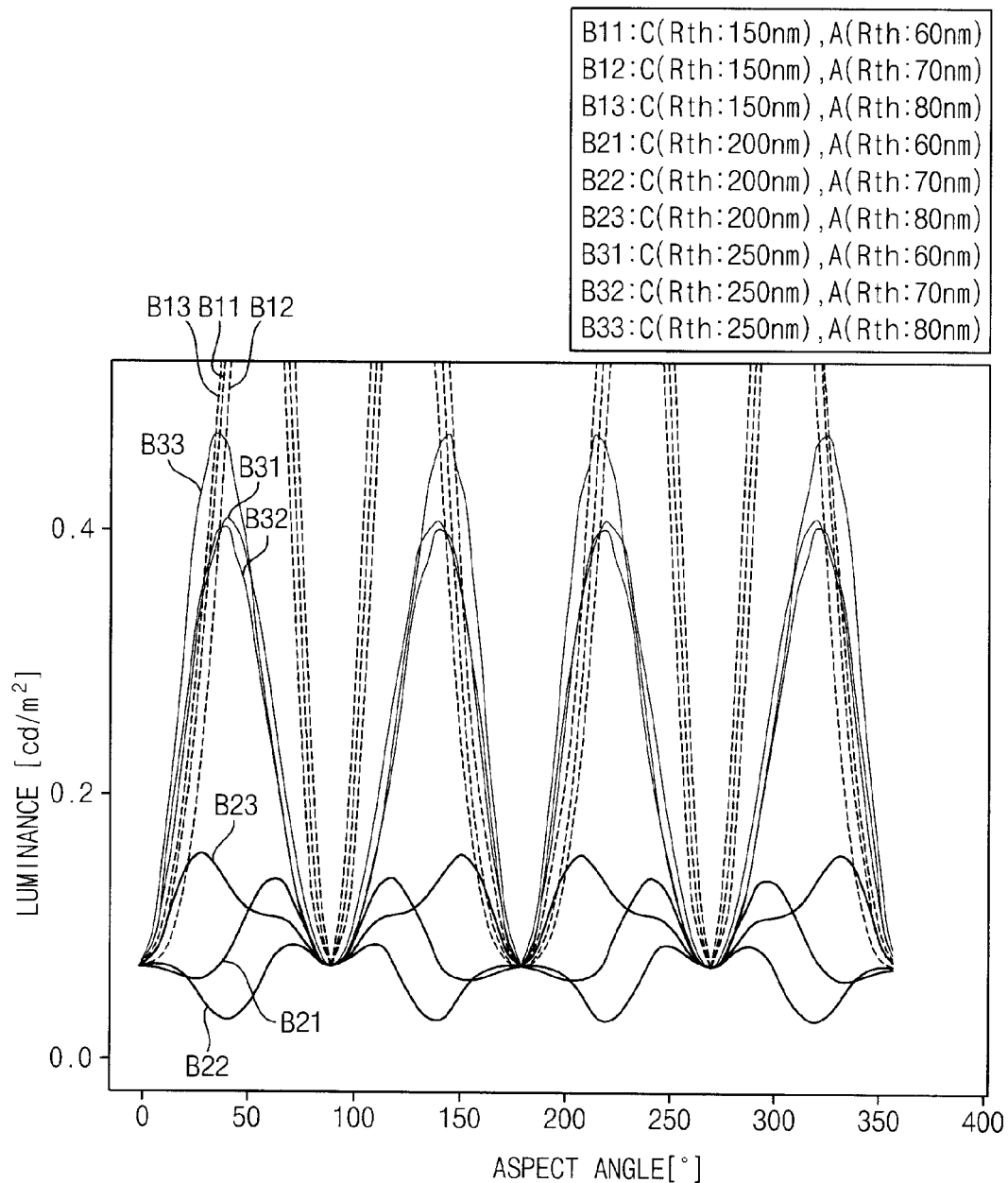
Figure 9C:
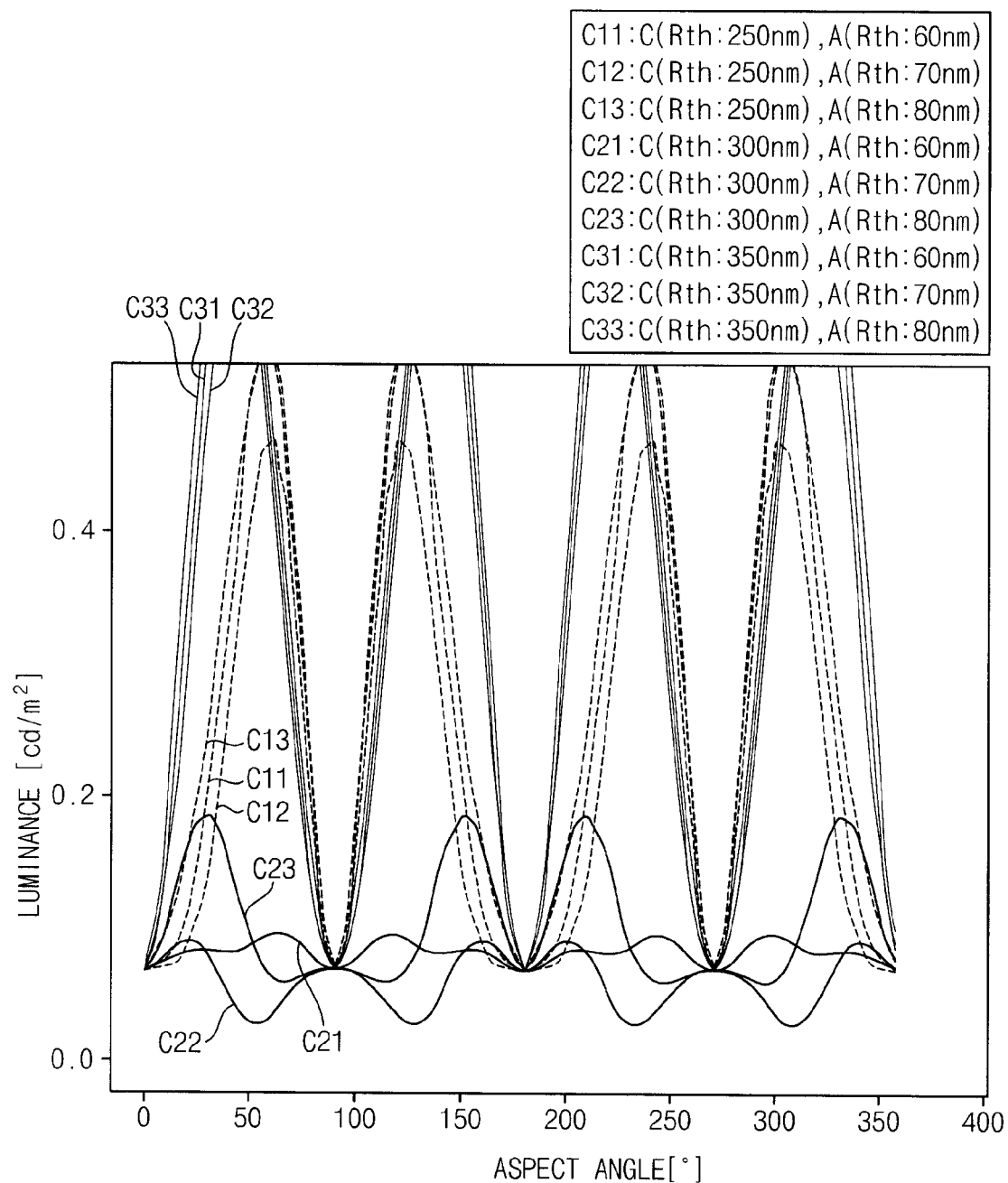
Figure 9D:
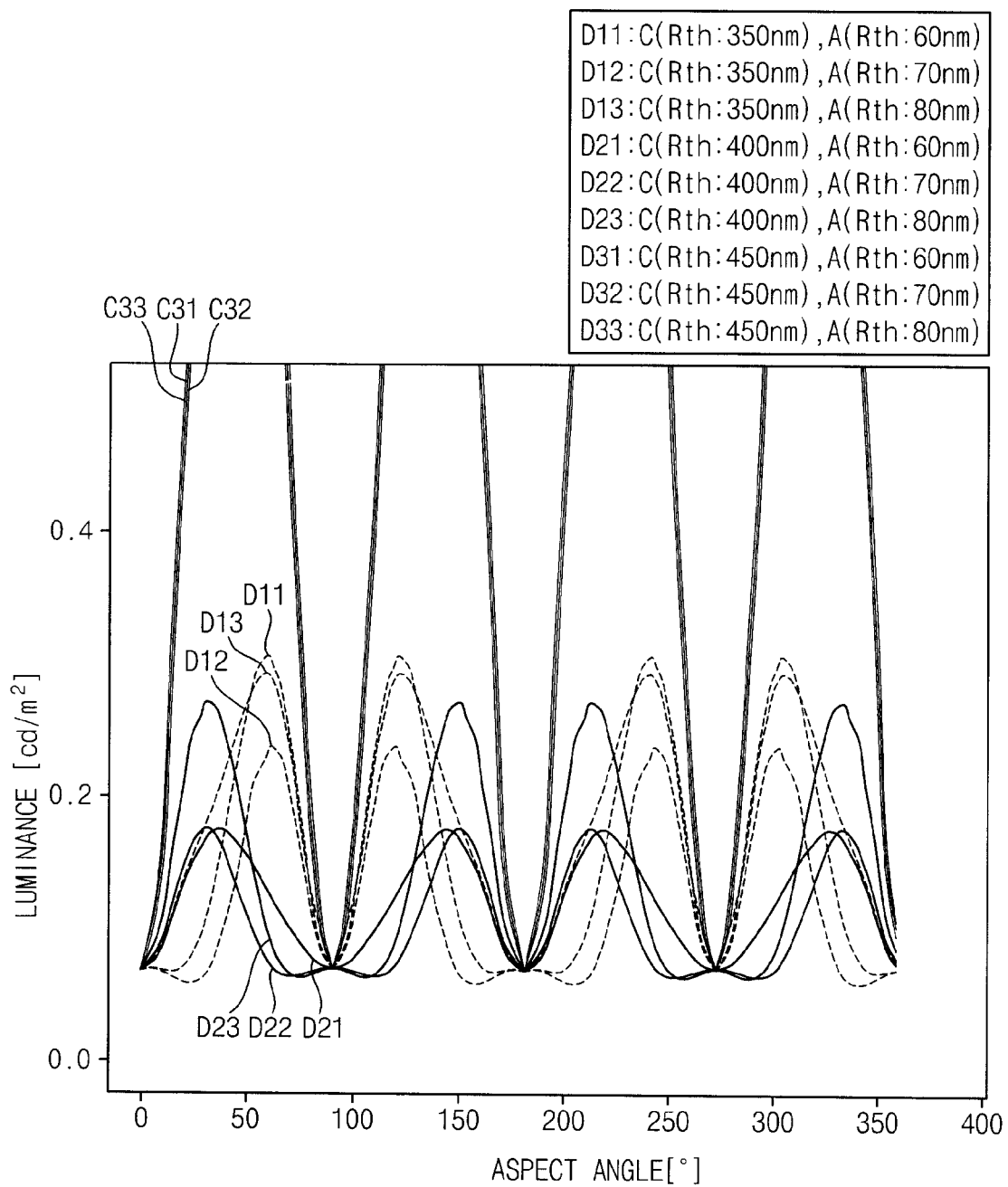

FIG. 8 is a Poincare sphere diagram showing a polarization state of a light after passing through the optical films of FIG. 7.

Referring back to FIGS. 4 and 7 and as shown in FIG. 8, the optical axis 132 of the liquid crystal layer 130 is an axis of rotation in a direction of the second coordinate axis S2, and the optical axis 232 of the negative C-plate 230 is an axis of rotation in an opposite direction of the second coordinate axis S2.

The optical axis 222 of the A-plate 220 is placed at the plane defined by the first and second coordinate axes 51 and S2.

In an exemplary embodiment, the extinction point E of the Poincare sphere is located in a direction of the second polarization axis of the second polarization plate 310. That is, the extinction point E of the Poincare sphere is located in an opposite direction of the upper-plate transmission axis A. The opposite direction of the upper-plate transmission axis A may be the second absorption axis 312.

The extinction point E may be a point corresponding to an ideal polarization state of light passing through from the first polarization plate 210 to the liquid crystal layer 130. When the polarization state of a light having passed through from the first polarization plate 210 to the liquid crystal layer 130 is substantially identical to the extinction point, a contrast ratio when viewed from the side of the display device is substantially increased.

In FIG. 8, the polarization state of the light having passed through the first polarization plate 210 is labeled "P." The polarization state of the light having passed through the A-plate 220 is labeled "P1." The polarization state of the light having passed through the liquid crystal layer 130 is labeled "P2." The polarization state of the light having passed through the negative C-plate 230 is labeled "P3."

As shown in FIG. 8, P3 may be substantially identical to the extinction point E, and the contrast ratio when viewed from the side of the display device is thereby substantially increased.

FIGS. 9A, 9B, 9C and 9D are graphs illustrating luminance (in cd/m²) versus aspect angle (in angular degrees) of a display panel in accordance with a phase retardation value in a thickness direction of the liquid crystal layer of FIG. 7 and a phase retardation value in a thickness direction of the optical films.

In an exemplary embodiment, a viewing angle may be 60 degrees.

Referring back to FIG. 8 and as shown in FIGS. 9A through 9D, the negative C-plate 230 and the A-plate 220 may satisfy the following conditions to obtain an optimum contrast ratio when viewed from a side of the display device. The thickness-direction phase retardation value of the negative C-plate 230 and the A-plate 220 with respect to a wavelength of the light have been adjusted, and distances between the extinction point and each polarization state of the light while passing through from the first polarization plate 210 to the liquid crystal layer 130 are thereby within about 0.1 nm.

As shown in curves of FIGS. 9A to 9D, a light leakage in a black state may occur at the aspect angle in a range from about 22.5° to about 67.5°, from about 112.5° to about 157.5°, from about 202.5° to about 247.5° and from about 292.5° to about 337.5° in which the luminance is substantially high, similarly to the curves of FIGS. 5A to 5D.

Specifically, the curves of FIGS. 9A to 9D show that more light leakage in a black state may occur at aspect angles of about 22.5°, 157.5°, 202.5° and 337.5° at which luminance values are substantially higher than the luminance values of the curves of FIGS. 5A to 5D at the aspect angles.

In FIGS. 9A to 9D, the light leakage in the black state may occur at an angle different from an angle at which the light leakage in the black state may occur in FIGS. 5A to 5D. Accordingly, an angle of the light leakage may be adjusted to prevent the light leakage effectively at a predetermined angle.

Figure 10:
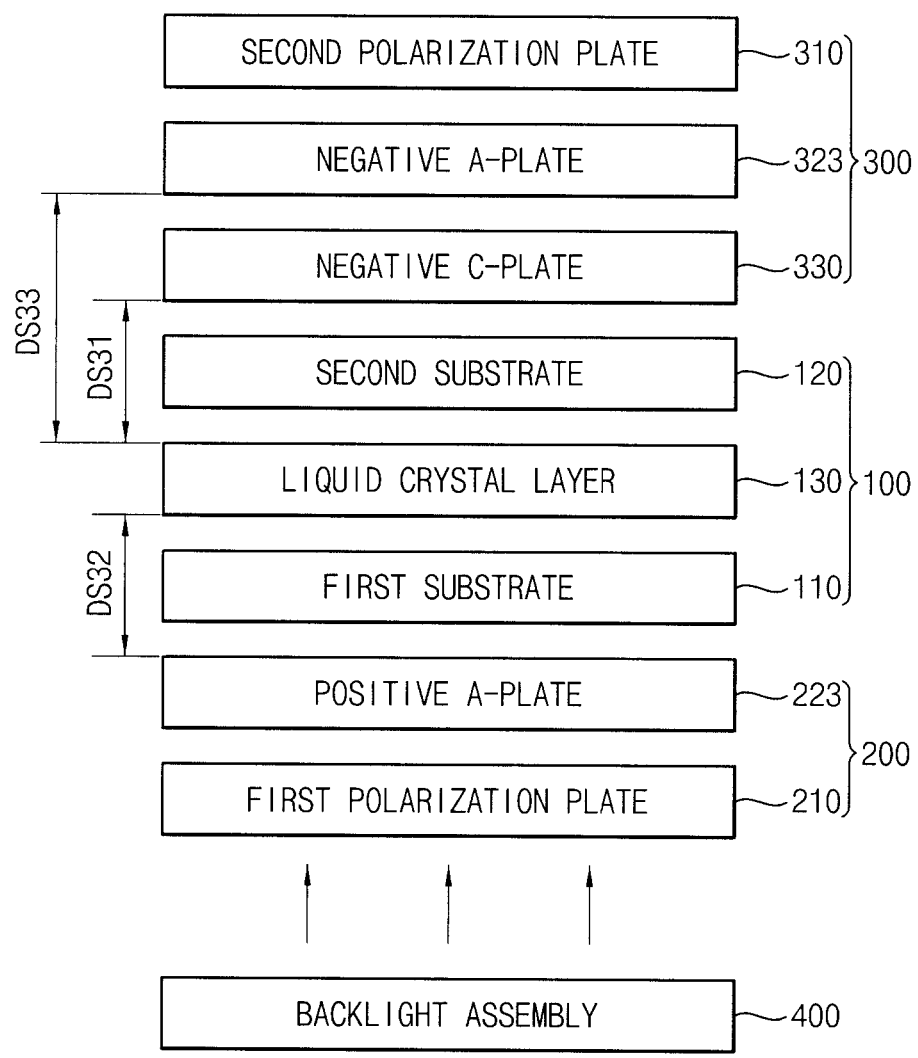
FIG. 10 is a partial cross-sectional view illustrating another exemplary embodiment of a display device according to the present invention.

FIG. 10 is a schematic cross-sectional view illustrating another exemplary embodiment of a display device according to the present invention.

Figure 11:
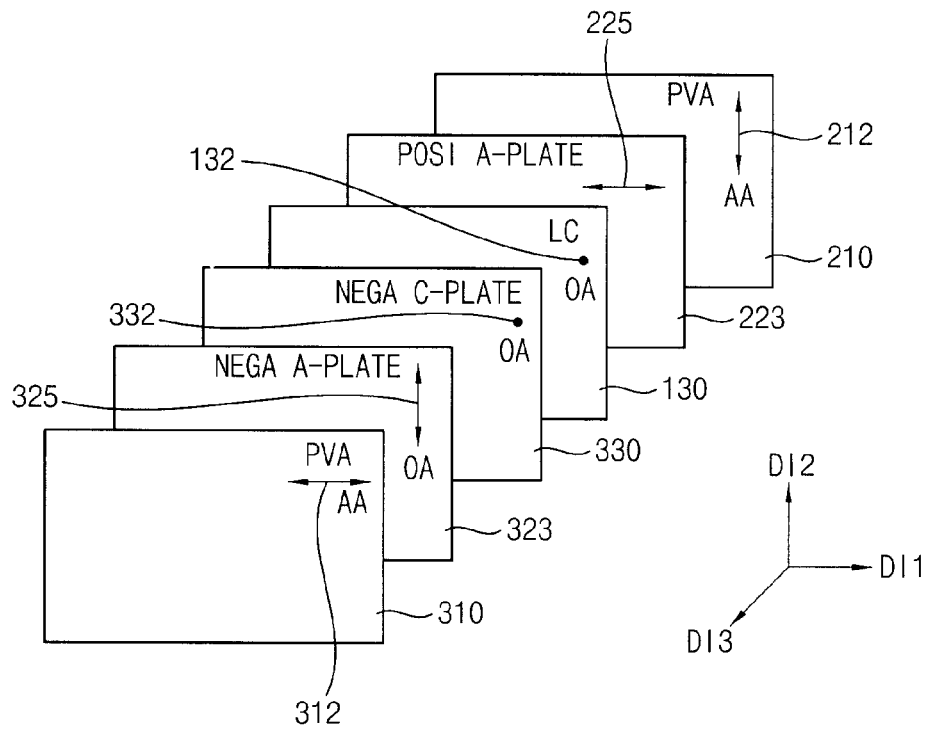
FIG. 11 is an exploded perspective view of optical films and a liquid crystal layer of the display device of FIG. 10.

FIG. 11 is a conceptual diagram showing a relationship among optical films and a liquid crystal layer of the display device of FIG. 10.

The display device shown in FIGS. 10 and 11 is substantially the same as the display device shown in FIGS. 1 and 3 except that a positive A-plate 223 is disposed between the first polarization plate 210 and the liquid crystal layer 130 instead of the negative C-plate 230, and except that a negative C-plate 330 and a negative A-plate 323 are sequentially disposed between the liquid crystal layer 130 and the second polarization plate 310 instead of the A-plate 320. The same or like elements shown in FIGS. 10 and 11 have been labeled with the same reference characters as used above to describe the exemplary embodiments of the display device shown in FIGS. 1 and 3, and any repetitive detailed description thereof will hereinafter be omitted or simplified Referring back to FIG. 3, and as shown in FIGS. 10 and 11, the first optical unit 200 includes optical films, for example, the first polarization plate 210, and the positive A-plate 223. The first polarization plate 210 is disposed below the display panel 100, and the positive A-plate 223 is disposed between the first polarization plate 210 and the display panel 100. Accordingly, the light generated from the backlight unit 400 disposed below the first polarization plate 210 passes through the first polarization plate 210 and the positive A-plate 223, and thereby proceeds to the display panel 100.

The second optical unit 300 includes optical films, for example, the second polarization plate 310, the negative A-plate 323, and the negative C-plate 330. The second polarization plate 310 is disposed above the display panel 100, the negative A-plate 323 is disposed between the display panel 100 and the second polarization plate 310, and the negative C-plate 330 is disposed between the display panel 100 and the negative A-plate 323.

The positive A-plate 223 is disposed above the first polarization plate 210. The positive A-plate 223 has an optical axis 225 substantially parallel to the second direction DI2 and to the second absorption axis 312 of the second polarization plate 310.

The negative C-plate 330 disposed above the liquid crystal layer 130 has an optical axis 332 substantially parallel to the third direction DI3. A refractive index in an x-axis direction, a refractive index in a y-axis direction and a refractive index in a z-axis direction of the negative C-plate 330 may satisfy a numerical condition of "nx=ny>nz", where "nx" represents a refractive index in an x-axis direction, "ny" represents a refractive index in a y-axis direction, and "nz" represents a refractive index in a z-axis direction. The x-axis direction is substantially parallel to the first direction DI1, the y-axis direction is substantially parallel to the second direction DI2, and the z-axis direction is substantially parallel to the third direction DI3.

An in-plane phase retardation value Ro of the negative C-plate 330 is about zero because nx is substantially equal to ny (nx=ny) and the in-plane phase retardation value Ro of the negative C-plate 330 is (nx−ny)×d, where "d" represents the thickness of the negative C-plate 330.

A thickness-direction phase retardation value Rth of the negative C-plate 330 is positive because nx and ny are greater than nz (nx=ny>nz) and the thickness-direction phase retardation value Rth of the negative C-plate 330 is [(nx+ny)/2−nz]×d.

The negative A-plate 323 disposed above the negative C-plate 330 has an optical axis 325 substantially parallel to the first direction DI1 and the first absorption axis 212 of the first polarization plate 210.

The positive A-plate 223 is disposed opposite, e.g., facing, the first polarization plate 210. The negative A-plate 323 is disposed opposite, e.g., facing, the second polarization plate 310. The negative C-plate 330 is disposed opposite, e.g., facing, the second substrate 120.

In an exemplary embodiment, a fifth distance DS31 between the negative C-plate 330 and the liquid crystal layer 130 may be substantially equal to a sixth distance DS32 between the positive A-plate 223 and the liquid crystal layer 130. The fifth distance DS31 between the negative C-plate 330 and the liquid crystal layer 130 may be less than a seventh distance DS33 between the negative A-plate 323 and the liquid crystal layer 130.

Figure 12:
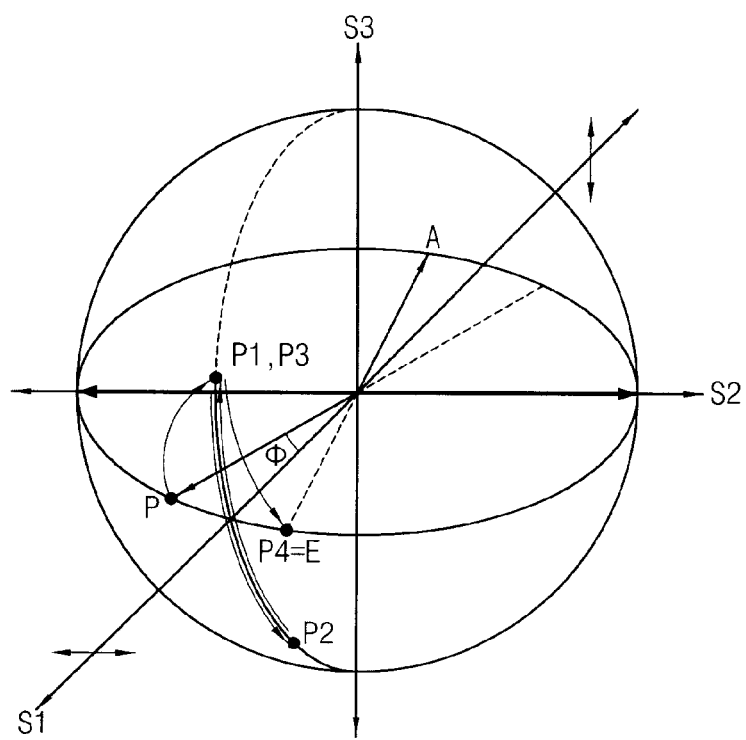
FIG. 12 is a Poincare sphere showing a polarization state of a light after passing through the optical films of FIG. 11.

FIG. 12 is a Poincare sphere diagram showing a polarization state of a light after passing through the optical films of FIG. 11.

Referring to back to FIGS. 4 and 11 and as shown in FIG. 12, the optical axis 132 of the liquid crystal layer 130 is an axis of rotation in a direction of the second coordinate axis S2, and the optical axis 332 of the negative C-plate 330 is an axis of rotation in an opposite direction of the second coordinate axis S2.

The optical axis 225 of the positive A-plate 223 is located at the plane defined by the first and second coordinate axes S1 and S2. In an exemplary embodiment, the sixth optical axis 225 of the positive A-plate 223 may be parallel to the second absorption axis 312. In addition, the optical axis 325 of the negative A-plate 323 is placed at the plane defined by the first and second coordinate axes S1 and S2. In an exemplary embodiment, the optical axis 325 of the negative A-plate 323 may be parallel to the first absorption axis 212.

In an exemplary embodiment, the extinction point E of the Poincare sphere is located in a direction of the second polarization axis of the second polarization plate 310. That is, the extinction point E of the Poincare sphere is located in an opposite direction of the upper-plate transmission axis A. The opposite direction of the upper-plate transmission axis A may be the second absorption axis 312.

The extinction point E may be a point corresponding to an ideal polarization state of light after passing through from the first polarization plate 210 to the negative A-plate 323. When a polarization state of the light having passed through from the first polarization plate 210 to the negative A-plate 323 is substantially identical to the extinction point, a contrast ratio when viewed from in the side of the display device may be substantially increased.

In an exemplary embodiment, the polarization state of the light having passed through the first polarization plate 210 is labeled "P." The polarization state of the light having passed through the positive A-plate 223 is labeled "P1." The polarization state of the light having passed through the liquid crystal layer 130 is labeled "P2." The polarization state of the light having passed through the negative C-plate 330 is labeled "P3." The polarization state of the light having passed through the negative A-plate 323 is labeled "P4."

As shown in FIG. 12, P4 may be substantially identical to the extinction point E, the contrast ratio when viewed from the side of the display device is thereby substantially increased.

In an exemplary embodiment, the display device includes the positive A-plate 223, the negative C-plate 330 and the negative A-plate 323, and the negative C-plate 330 is substantially adjacent to the liquid crystal layer 130 so that the light leakage is substantially reduced, and the contrast ratio when viewed from the side of the display device is substantially increased. In an exemplary embodiment, the number of the optical films is substantially increased and the light leakage is thereby substantially reduced.

Figure 13:
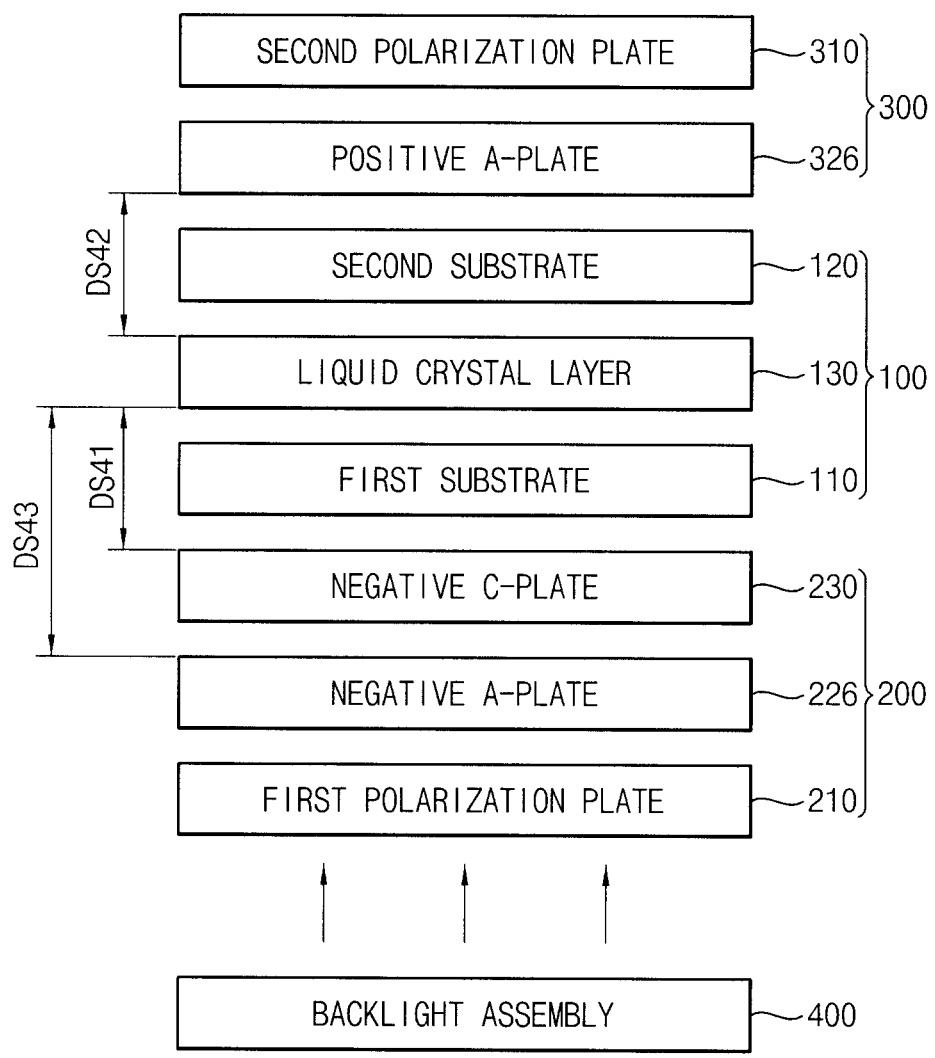
FIG. 13 is a partial cross-sectional view illustrating yet another exemplary embodiment of a display device according to the present invention.

FIG. 13 is a schematic partial cross-sectional view illustrating an exemplary embodiment of a display device according to the present invention.

Figure 14:
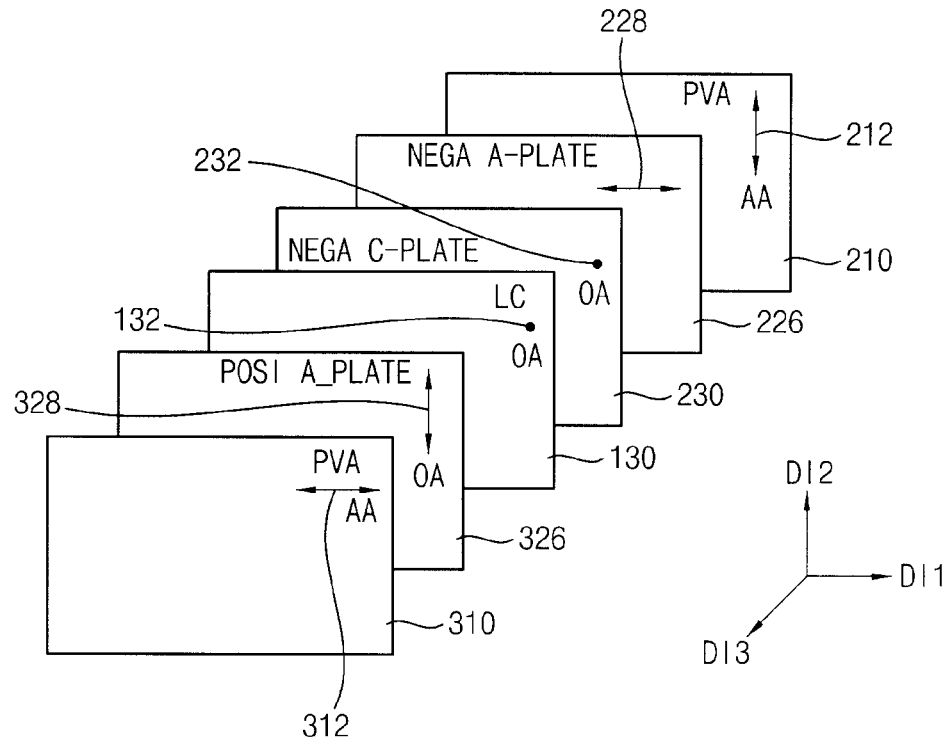
FIG. 14 is an exploded perspective view of optical films and a liquid crystal layer of the display device of FIG. 13.

FIG. 14 is a conceptual diagram showing a relationship among optical films and a liquid crystal layer of the display device of FIG. 10.

The display device in FIGS. 13 and 14 is substantially the same as the display device shown in FIGS. 1 and 3 except that a negative A-plate 226 and the negative C-plate 230 are sequentially disposed between the first polarization plate 210 and the liquid crystal layer 130 instead of the negative C-plate 230, and except that a positive A-plate 326 is disposed between the liquid crystal layer 130 and the second polarization plate 310 instead of the A-plate 320. The same or like elements shown in FIGS. 13 and 14 have been labeled with the same reference characters as used above to describe the exemplary embodiments of the display device shown in FIGS. 1 and 3, and any repetitive detailed description thereof will hereinafter be omitted or simplified.

Referring back to FIG. 3, and as shown in 13 and 14, the first optical unit 200 includes optical films, for example, the first polarization plate 210, the negative A-plate 226 and the negative C-plate 230. The first polarization plate 210 is disposed below the display panel 100, the negative A-plate 226 is disposed between the first polarization plate 210 and the display panel 100, and the negative C-plate 230 is disposed between the display panel 100 and the negative A-plate 226. Accordingly, the light generated from the backlight unit 400 disposed below the first polarization plate 210 passes through the first polarization plate 210, the negative A-plate 226 and the negative C-plate 230, and thereby proceeds to the display panel 100.

The second optical unit 300 includes optical films, for example, the second polarization plate 310 and a positive A-plate 326. The second polarization plate 310 is disposed above the display panel 100, and the positive A-plate 326 is disposed between the display panel 100 and the second polarization plate 310.

The negative A-plate 226 is disposed above the first polarization plate 210. The negative A-plate 226 has an optical axis 228 substantially parallel to the second direction DI2 and the second absorption axis 312 of the second polarization plate 310.

The positive A-plate 326 is disposed above the negative C-plate 230. The positive A-plate 326 has an optical axis 328 substantially parallel to the second direction DI2 and the first absorption axis 212 of the first polarization plate 210.

The negative A-plate 226 is disposed opposite, e.g., facing, the first polarization plate 210. The positive A-plate 326 is disposed opposite, e.g., facing, the second polarization plate 310. The negative C-plate 230 is disposed opposite, e.g., facing, the first substrate 110.

In an exemplary embodiment a eighth distance DS41 between the negative C-plate 230 and the liquid crystal layer 130 may be substantially equal to a ninth distance DS42 between the positive A-plate 326 and the liquid crystal layer 130. The eighth distance DS41 between the negative C-plate 230 and the liquid crystal layer 130 may be less than a tenth distance DS43 between the negative A-plate 226 and the liquid crystal layer 130.

Figure 15:
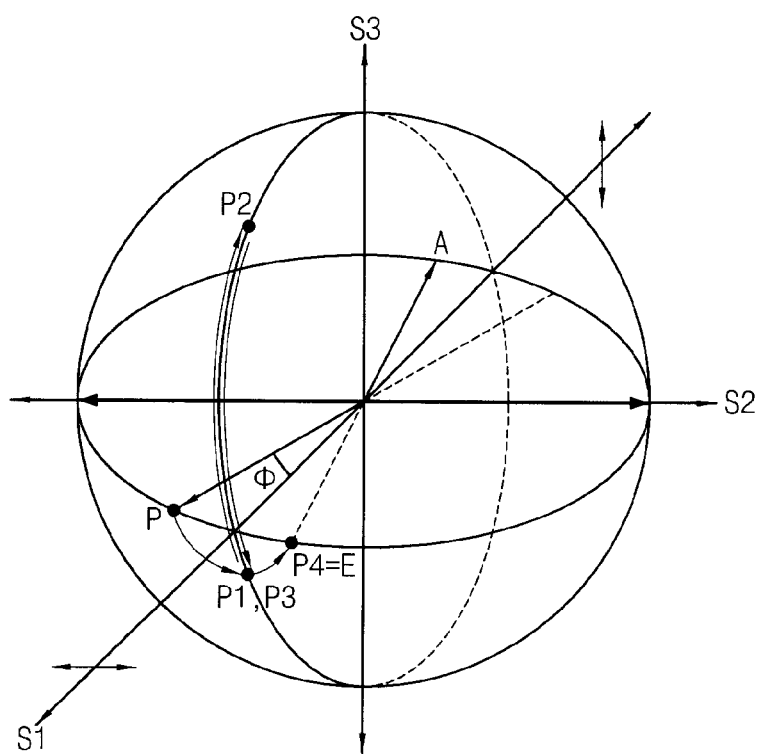
FIG. 15 is a Poincare sphere showing a polarization state of a light after passing through the optical films of FIG. 14.

FIG. 15 is a Poincare sphere diagram showing a polarization state of a light after passing through the optical films of FIG. 14.

Referring back to FIG. 4 and as shown in FIGS. 14 and 15, the optical axis 132 of the liquid crystal layer 130 is an axis of rotation in a direction of the second coordinate axis S2, and the optical axis 232 of the negative C-plate 230 is an axis of rotation in an opposite direction of the second coordinate axis S2.

The optical axis 228 of the negative A-plate 226 is placed at the plane defined by the first and second coordinate axes 51 and S2. In an exemplary embodiment, the optical axis 228 of the negative A-plate 226 may be substantially parallel to the second absorption axis 312. The optical axis 328 of the positive A-plate 326 is placed at the plane defined by the first and second coordinate axes S1 and S2. In an exemplary embodiment, the optical axis 328 of the positive A-plate 326 may be substantially parallel to the first absorption axis 212.

In an exemplary embodiment, the extinction point E of the Poincare sphere is located in a direction of the second polarization axis of the second polarization plate 310. That is, the extinction point E of the Poincare sphere is located in an opposite direction of the upper-plate transmission axis A. The opposite direction of the upper-plate transmission axis A may be the second absorption axis 312.

The extinction point E may be a point corresponding to an ideal polarization state of light passing from the first polarization plate 210 to the positive A-plate 326. When the lights in the polarization states having passed from the first polarization plate 210 to the positive A-plate 326 are gathered into the extinction point, a contrast ratio when viewed from the side of the display device is substantially increased.

For example, the polarization state of the light having passed through the first polarization plate 210 is labeled "P." Then, the polarization state of the light having passed from the negative A-plate 226 is labeled "P1." The polarization state of the light having passed from the negative C-plate 230 is labeled "P2." The polarization state of the light having passed from the liquid crystal layer 130 is labeled "P3." The polarization state of the light having passed from the positive A-plate 326 is labeled "P4."

As shown in FIG. 15, P4 may be substantially identical to the extinction point E, and the contrast ratio when viewed from the side of the display device is thereby substantially increased.

In an exemplary embodiment, the display device includes the negative A-plate 226, the negative C-plate 230 and the positive A-plate 326. When the negative C-plate 230 is substantially adjacent to the liquid crystal layer 130, the light leakage is substantially reduced and the contrast ratio when viewed from the side of the display device is thereby substantially increased. In an exemplary embodiment, the number of the optical films is substantially increased and, the light leakage is thereby substantially reduced.

The light leakage in the black state of the exemplary embodiment in FIG. 13 may occur at an angle different from an angle at which the light leakage in the black state of the exemplary embodiment in FIG. 10 may occur. Accordingly, an angle of the light leakage may be adjusted to prevent the light leakage effectively at a predetermined angle.

Figure 16:
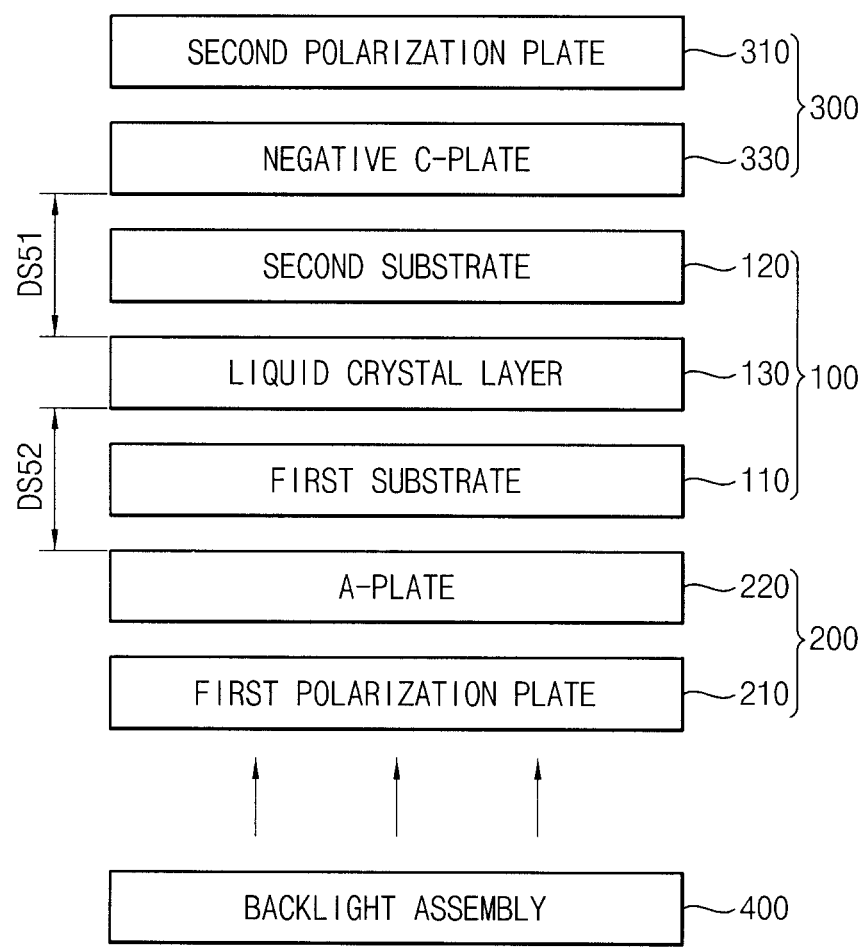
FIG. 16 is a partial cross-sectional view illustrating still another exemplary embodiment of a display device according to the present invention.

FIG. 16 is a schematic partial cross-sectional view illustrating an exemplary embodiment of a display device according to the present invention.

The display device in FIG. 16 is substantially the same as the display device shown in FIG. 1 except that the display device includes an A-plate 220 instead of the negative C-plate 230 and that the display device includes a negative C-plate 330 instead of the A-plate 320. The same or like elements shown in FIG. 16 have been labeled with the same reference characters as used above to describe the exemplary embodiments of the display device shown in FIG. 1, and any repetitive detailed description thereof will hereinafter be omitted or simplified.

Referring back to FIGS. 3 and 4 and as shown in FIG. 16, the first optical unit 200 includes optical films, for example, the first polarization plate 210 and the A-plate 220. The first polarization plate 210 is disposed below the display panel 100, and the A-plate 220 is disposed between the first polarization plate 210 and the display panel 100. Accordingly, the light generated from the backlight unit 400 disposed below the first polarization plate 210 passes through the first polarization plate 210 and the A-plate 220, and thereby proceeds to the display panel 100.

The second optical unit 300 includes optical films, for example, the second polarization plate 310 and the negative C-plate 330. The second polarization plate 310 is disposed above the display panel 100, and the negative C-plate 330 is disposed between the display panel 100 and the second polarization plate 310.

The negative C-plate 330 is disposed opposite, e.g., facing, the second substrate 120, and the A-plate 220 is disposed opposite, e.g., facing, the first polarization plate 210.

In an exemplary embodiment, a eleventh distance DS51 between the negative C-plate 330 and the liquid crystal layer 130 may be substantially equal to a twelfth distance DS52 between the A-plate 220 and the liquid crystal layer 130.

A graph showing a polarization state of a light after passing through the optical films of FIG. 16 is substantially the same as the graph in FIG. 4 except for a compensation order. Accordingly, the same reference characters will be used to designate the same components, and any repetitive detailed description thereof will hereinafter be omitted.

Graphs showing luminance versus aspect angle of a display panel in accordance with an exemplary embodiment in FIG. 16 are substantially the same as the graphs in FIGS. 5A to 5D. Accordingly, the same reference characters will be used to designate the same components, and any repetitive detailed description thereof will hereinafter be omitted.

In an exemplary embodiment, the display device includes the A-plate 220 and the negative C-plate 330, and the negative C-plate 330 is substantially adjacent to the liquid crystal layer 130, and the light leakage is thereby substantially reduced.

Accordingly, the contrast ratio when viewed from the side of the display device is substantially increased.

Figure 17:
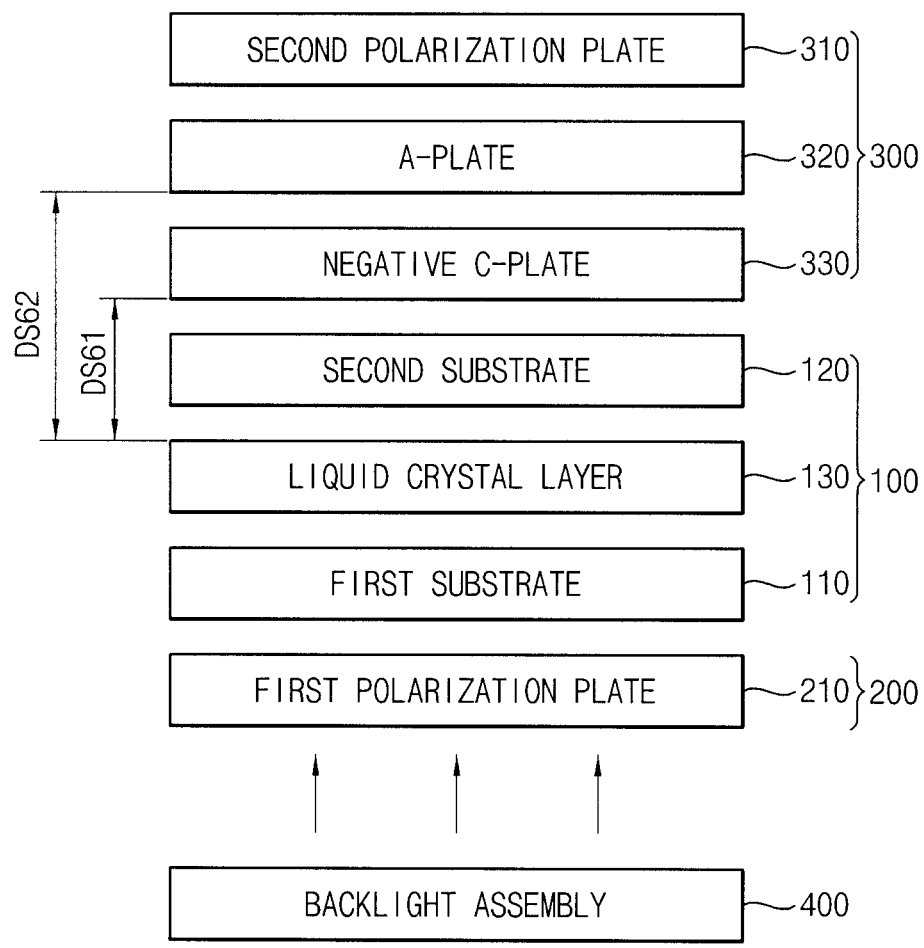
FIG. 17 is a partial cross-sectional view illustrating yet another exemplary embodiment of a display device according to the present invention.

FIG. 17 is a schematic partial cross-sectional view illustrating yet another exemplary embodiment of a display device according to the present invention.

The display device in FIG. 17 is substantially the same as the display device shown in FIG. 6 except that a negative C-plate 330 and an A-plate 320 are disposed above the display panel 100 instead of being disposed below the display panel 100. The same or like elements shown in FIG. 17 have been labeled with the same reference characters as used above to describe the exemplary embodiments of the display device shown in FIG. 1, and any repetitive detailed description thereof will hereinafter be omitted or simplified.

Referring back to FIGS. 7 and 8, and as shown in FIG. 17, the first optical unit 200 includes optical films, for example, the first polarization plate 210 and the A-plate 220. Accordingly, the light generated from the backlight unit 400 disposed below the first polarization plate 210 passes through the first polarization plate 210 and the positive A-plate 223, and thereby proceeds to the display panel 100.

The second optical unit 300 includes optical films, for example, the second polarization plate 310, the A-plate 320 and the negative C-plate 330. The second polarization plate 310 is disposed below the display panel 100, the A-plate 320 is disposed between the display panel 100 and the second polarization plate 310, and the negative C-plate 330 is disposed between the display panel 100 and the A-plate 320.

The A-plate 320 is disposed opposite, e.g., facing, the second polarization plate 310. The negative C-plate 330 is disposed opposite, e.g., facing, the second substrate 120.

In an exemplary embodiment, a thirteenth distance DS61 between the negative C-plate 330 and the liquid crystal layer 130 may be less than a fourteenth distance DS62 between the A-plate 320 and the liquid crystal layer 130.

A graph showing a polarization state of a light after passing through the optical films of FIG. 17 is substantially the same as the graph in FIG. 8 except for a compensation order of the optical films. Accordingly, the same reference numerals will be used to designate the same components, and any repetitive detailed description thereof will hereinafter be omitted.

Graphs showing luminance versus aspect angle of a display panel in accordance with an exemplary embodiment in FIG. 17 are substantially the same as the graphs in FIGS. 9A to 9D. Thus, the same reference characters will be used to designate the same components, and any repetitive detailed description thereof will hereinafter be omitted.

In an exemplary embodiment, the display device includes the A-plate 320 and the negative C-plate 330, and the negative C-plate 330 is substantially adjacent to the liquid crystal layer 130 so that the light leakage is substantially reduced. Accordingly, the contrast ratio when viewed from the side of the display device is thereby substantially increased.

The light leakage in the black state of the exemplary embodiment in FIG. 17 may occur at an angle different from an angle at which the light leakage in the black state of the exemplary embodiment in FIG. 1 may occur. Accordingly, an angle of the light leakage may be adjusted to prevent the light leakage effectively at a predetermined angle.

Figure 18:
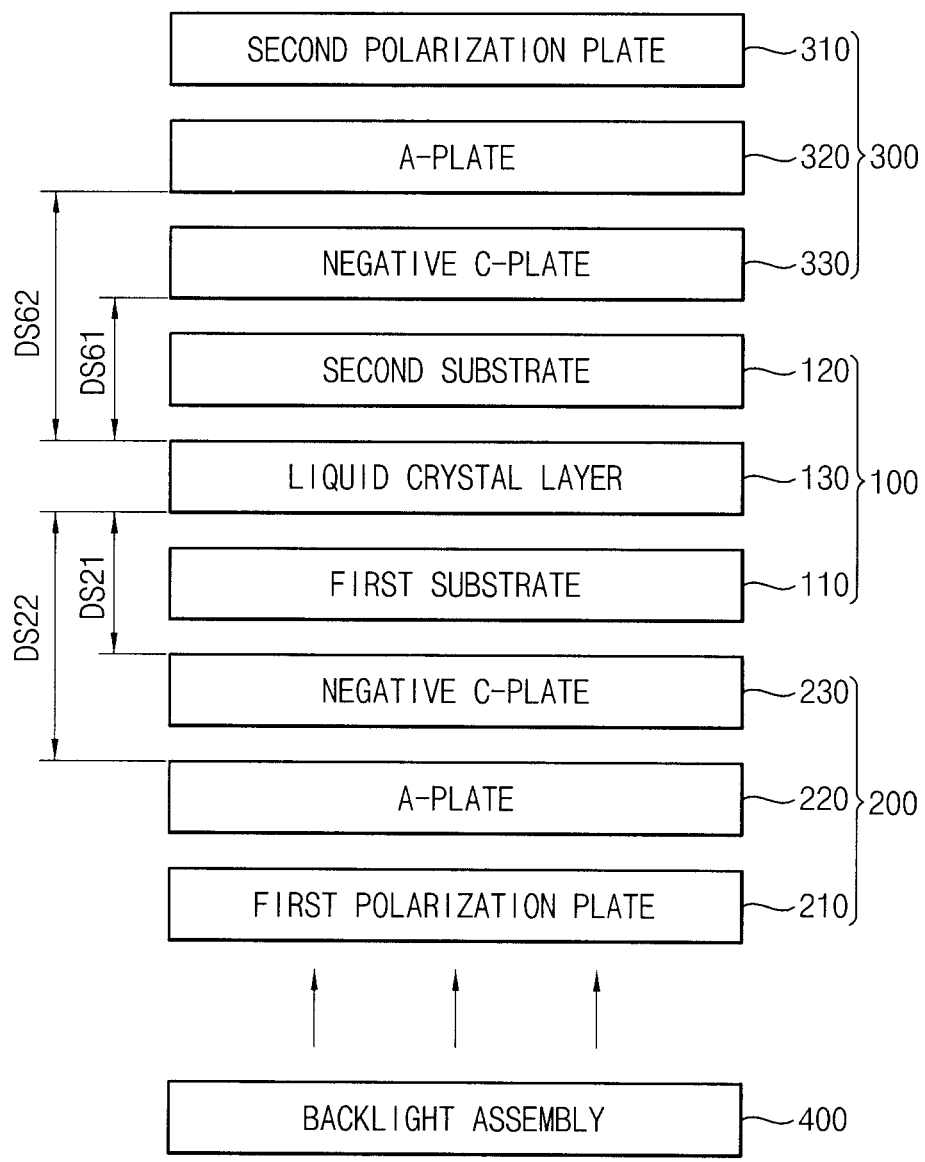
FIG. 18 is a partial cross-sectional view illustrating still another exemplary embodiment of a display device according to the present invention.

FIG. 18 is a schematic partial cross-sectional view illustrating still another exemplary embodiment of a display device according to the present invention.

The first optical unit 200 of display device in FIG. 18 is substantially the same as the first optical unit of the display device shown in FIG. 6, and the second optical unit 300 of the display device in FIG. 18 is substantially the same as the second optical unit of the display device in FIG. 17. The same or like elements shown in FIG. 18 have been labeled with the same reference characters as used above to describe the exemplary embodiments of the display device shown in FIGS. 6 and 17, and any repetitive detailed description thereof will hereinafter be omitted or simplified.

The A-plate 220 is disposed opposite, e.g., facing, the first polarization plate 210. The negative C-plate 230 is disposed opposite, e.g., facing, the first substrate 110.

In an exemplary embodiment, the third distance DS21 between the negative C-plate 230 and the liquid crystal layer 130 may be less than the fourth distance DS22 between the A-plate 220 and the liquid crystal layer 130.

The A-plate 320 is disposed opposite, e.g., facing, the second polarization plate 310. The negative C-plate 330 is disposed opposite, e.g., facing, the second substrate 120.

In an exemplary embodiment, a thirteenth distance DS61 between the negative C-plate 330 and the liquid crystal layer 130 may be less than a fourteenth distance DS62 between the A-plate 320 and the liquid crystal layer 130.

The thickness-direction phase retardation value Rth of the negative C-plate 230 and the thickness-direction phase retardation value Rth of the negative C-plate 330, respectively, are substantially equal to or less than a value acquired by subtracting about 115 nm from a thickness-direction phase retardation value Rth of the liquid crystal layer 130, and are substantially equal to or greater than a value acquired by subtracting about 275 nm from the thickness-direction phase retardation value Rth of the liquid crystal layer 130.

In an exemplary embodiment, the light leakage is substantially reduced when an optimum value, acquired by subtracting one of the thickness-direction phase retardation value Rth of the negative C-plate 230 and the negative C-plate 330 from the thickness-direction phase retardation value Rth of the liquid crystal layer 130, is in a range from about 115 nm to about 275 nm.

A graph showing a polarization state of a light after passing through the optical films is substantially the same as the graph in FIG. 8 except for a compensation order of the optical film. Accordingly, the same reference characters will be used to designate the same components, and any repetitive detailed description thereof will hereinafter be omitted.

In an exemplary embodiment, the display device includes the A-plate 320 and the negative C-plate 330, and the negative C-plate 330 is substantially adjacent to the liquid crystal layer 130, and the light leakage is thereby substantially reduced. Accordingly, the contrast ratio when viewed from the side of the display device is substantially increased.

In an exemplary embodiment, the display device uses all of the optical films of FIGS. 6 and 17, and the light leakage occurred at angles of about 22.5°, 157.5°, 202.5° and 337.5° is thereby more effectively reduced.

According to exemplary embodiments of the present invention as described herein, the display device including the A-plate and the negative C-plate which can gather polarization states of light dispersed by the liquid crystal layer into an extinction point of Poincare sphere provides advantages which include, but are not limited thereto, effectively preventing reduction of the contrast ratio caused by a dispersion of the polarization states of the light and substantially increasing the contrast ratio when viewed from the side of the display device.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. An optical film assembly comprising:
a first polarization plate disposed below a liquid crystal layer and having a first absorption axis;
a second polarization plate disposed above the liquid crystal layer and having a second absorption axis substantially perpendicular to the first absorption axis;
an A-plate disposed between the first polarization plate and the second polarization plate; and
a negative C-plate disposed between the first polarization plate and the second polarization plate,
wherein a thickness-direction phase retardation value of the negative C-plate is equal to or less than a value acquired by subtracting about 75 nanometers from a thickness-direction phase retardation value of the liquid crystal layer, and
the thickness-direction phase retardation value of the negative C-plate is equal to or greater than a value acquired by subtracting about 275 nanometers from the thickness-direction phase retardation value of the liquid crystal layer.

2. The optical film assembly of claim 1, wherein a distance between the negative C-plate and the liquid crystal layer is equal to or less than a distance between the A-plate and the liquid crystal layer.

3. The optical film assembly of claim 1, wherein
the A-plate is disposed between the liquid crystal layer and the second polarization plate, and
the negative C-plate is disposed between the liquid crystal layer and the first polarization plate.

4. The optical film assembly of claim 1, wherein the A-plate comprises a negative A-plate.

5. The optical film assembly of claim 1, wherein
the A-plate is disposed between the liquid crystal layer and the first polarization plate, and
the negative C-plate is disposed between the liquid crystal layer and the A-plate.

6. The optical film assembly of claim 1, further comprising a plurality of A-plates, wherein the plurality of A-plates includes at least one of a negative A-plate and a positive A-plate.

7. The optical film assembly of claim 1, further comprising a plurality of A-plates including a negative A-plate and a positive A-plate, wherein
the negative A-plate is disposed between the liquid crystal later and the second polarization plate,
the negative C-plate is disposed between the liquid crystal layer and the negative A-plate, and
the positive A-plate is disposed between the liquid crystal later and the first polarization plate.

8. The optical film assembly of claim 1, further comprising a plurality of A-plates including a positive A-plate and a negative A-plate, wherein
the positive A-plate is disposed between the liquid crystal layer and the second polarization plate,
the negative A-plate is disposed between the liquid crystal layer and the first polarization plate, and
the negative C-plate is disposed between the liquid crystal layer and the negative A-plate.

9. The optical film assembly of claim 1, wherein
the A-plate is disposed between the liquid crystal layer and the first polarization plate, and
the negative C-plate is disposed between the liquid crystal layer and the second polarization plate.

10. The optical film assembly of claim 1, wherein
the A-plate is disposed between the liquid crystal layer and the second polarization plate, and
the negative C-plate is disposed between the liquid crystal layer and the A-plate.

11. The optical film assembly of claim 1, wherein
the A-plate is disposed between the liquid crystal layer and the first polarization plate,
an additional A-plate is disposed between the liquid crystal layer and the second polarization plate,
the negative C-plate is disposed between the liquid crystal layer and the A-plate, and
an additional negative C-plate is disposed between the liquid crystal layer and the additional A-plate.

12. A display device comprising:
a display panel comprising:
a first substrate including a first pixel electrode which receives a first voltage and a second pixel electrode which receives a second voltage;
a second substrate disposed opposite the first substrate; and
a liquid crystal layer disposed between the first substrate and the second substrate; and
an optical film assembly comprising:
a first polarization plate disposed below the first substrate and having a first absorption axis;
a second polarization plate disposed above the second substrate and having a second absorption axis substantially perpendicular to the first absorption axis;
an A-plate disposed between the first polarization plate and the second polarization plate; and
a negative C-plate disposed between the first polarization plate and the second polarization plate, wherein
the liquid crystal layer is substantially vertically aligned with respect to a plane defined by a surface of the first substrate when the first voltage is not applied to the first pixel electrode and the second voltage is not applied to the second pixel electrode,
the liquid crystal layer is substantially horizontally aligned with respect to the plane defined by the surface of the first substrate when the first voltage is applied to the first pixel electrode and the second voltage is applied to the second pixel electrode,
a thickness-direction phase retardation value of the negative C-plate is equal to or less than a value acquired by subtracting about 75 nanometers from a thickness-direction phase retardation value of the liquid crystal layer, and
the thickness-direction phase retardation value of the negative C-plate is equal to or greater than a value acquired by subtracting about 275 nanometers from the thickness-direction phase retardation value of the liquid crystal layer.

13. The display device of claim 12, wherein a distance between the negative C-plate and the liquid crystal layer is equal to or less than a distance between the A-plate and the liquid crystal layer.

14. The display device of claim 12, wherein
the first polarization plate is disposed below the display panel, and
the second polarization plate is disposed above the display panel.

15. The display device of claim 12, further comprising a plurality of A-plates including at least one of a negative A-plate and a positive A-plate.

16. The display device of claim 12, wherein the negative C-plate and the A-plate change a polarization state of light, which is dispersed by the liquid crystal layer, to correspond to an extinction point of a Poincare sphere.

17. The display device of claim 12, wherein the thickness-direction phase retardation value of the liquid crystal layer is in a range from about 220 nanometers to about 520 nanometers.

18. The display device of claim 12, wherein the thickness-direction phase retardation value of the negative C-plate is in a range from about 100 nanometers to about 400 nanometers.

19. The display device of claim 12, wherein a thickness-direction phase retardation value of the A-plate is in a range from about 60 nanometers to about 80 nanometers.

20. The display device of claim 12, wherein the first pixel electrode and the second pixel electrode respectively include a plurality of electrode bars so that the first pixel electrode and the second pixel electrode are disposed alternately, the first pixel electrode is electrically connected to a data line receiving the first voltage, and the second pixel electrode is electrically connected to a power line receiving the second voltage.

* * * * *